(12) United States Patent
Richey

(10) Patent No.: US 11,747,125 B2
(45) Date of Patent: Sep. 5, 2023

(54) MAGNETIC TAPE MEASURE MOUNT

(71) Applicant: Brian Richey, Arroyo Grande, CA (US)

(72) Inventor: Brian Richey, Arroyo Grande, CA (US)

( * ) Notice: Subject to any disclaimer, the term of this patent is extended or adjusted under 35 U.S.C. 154(b) by 152 days.

(21) Appl. No.: 17/340,301

(22) Filed: Jun. 7, 2021

(65) Prior Publication Data

US 2021/0364268 A1 Nov. 25, 2021

Related U.S. Application Data

(63) Continuation-in-part of application No. 16/282,668, filed on Feb. 22, 2019, now Pat. No. 11,029,136.

(60) Provisional application No. 62/633,872, filed on Feb. 22, 2018.

(51) Int. Cl.
G01B 3/1071 (2020.01)
G01B 3/1048 (2020.01)

(52) U.S. Cl.
CPC ......... G01B 3/1071 (2013.01); G01B 3/1048 (2020.01); *G01B 2003/1074* (2013.01)

(58) Field of Classification Search
None
See application file for complete search history.

(56) References Cited

U.S. PATENT DOCUMENTS

| | | |
|---|---|---|
| 3,233,802 A | 2/1966 | Ludwick |
| 4,736,877 A | 4/1988 | Clark |
| D311,874 S | 11/1990 | Ingram, II et al. |
| D315,109 S | 3/1991 | Ingram, II et al. |
| 5,025,966 A | 6/1991 | Potter |
| 5,213,240 A | 5/1993 | Dietz et al. |
| 5,230,159 A | 7/1993 | Lipsey |
| D397,950 S | 9/1998 | Blackman et al. |
| 6,149,116 A | 11/2000 | Won |
| 6,161,741 A | 12/2000 | French |
| 6,267,277 B1 | 7/2001 | Taylor |
| 6,401,253 B2 | 6/2002 | Brunson |
| 6,457,252 B1 | 10/2002 | Kershner |
| 6,502,727 B1 | 1/2003 | Decoteau |
| 6,658,756 B1 | 12/2003 | Sanchez, Jr. |
| 6,685,067 B2 | 2/2004 | French |
| 6,824,028 B2 | 11/2004 | Mutai et al. |
| 7,076,885 B2 | 8/2006 | Potter |
| 7,114,592 B1 | 10/2006 | Gibson et al. |
| 7,269,869 B1 | 9/2007 | Ruffino |
| 7,322,068 B1 | 1/2008 | Kim |
| 7,374,142 B2 | 5/2008 | Carnevali |
| 7,431,251 B2 | 10/2008 | Carnevali |
| 7,971,277 B2 | 7/2011 | Romiti |
| D670,586 S | 11/2012 | Fetterly |
| 8,403,140 B2 | 3/2013 | Woolery |
| 8,499,943 B1 | 8/2013 | Neldner |
| 8,499,986 B2 | 8/2013 | Knight et al. |
| 8,516,621 B2 | 8/2013 | Woolery |

(Continued)

FOREIGN PATENT DOCUMENTS

FR 2974172 A1 * 10/2012 ........... G01B 3/1041

*Primary Examiner* — Christopher W Fulton
(74) *Attorney, Agent, or Firm* — The Roy Gross Law Firm, LLC; Roy Gross

(57) ABSTRACT

Systems and methods for manufacturing, implanting and using a magnetic tape measure mount to secure a tape measure or other related instrument magnetically to a user, to a user's belt, or work belt.

20 Claims, 15 Drawing Sheets

(56) References Cited

U.S. PATENT DOCUMENTS

| | | | |
|---|---|---|---|
| 8,966,778 | B2 | 5/2015 | Rubin |
| 9,038,873 | B2 | 5/2015 | Moreau et al. |
| 9,167,884 | B2 | 10/2015 | Moreau et al. |
| D773,325 | S | 12/2016 | Browning et al. |
| D808,831 | S | 1/2018 | Dempsey et al. |
| 10,736,406 | B2 | 8/2020 | Hintze |
| 11,029,136 | B2 * | 6/2021 | Richey ............... G01B 3/1071 |
| 2003/0167651 | A1 | 9/2003 | Pedersen |
| 2004/0232291 | A1 | 11/2004 | Carnevali |
| 2005/0145656 | A1 | 7/2005 | Knight et al. |
| 2005/0268480 | A1 | 12/2005 | Potter |
| 2007/0099469 | A1 | 5/2007 | Sorensen |
| 2009/0094801 | A1 | 4/2009 | Woolery |
| 2009/0145938 | A1 | 6/2009 | Kahn |
| 2009/0314813 | A1 | 12/2009 | Woolery |
| 2010/0025442 | A1 | 2/2010 | Shurm |
| 2010/0095427 | A1 | 4/2010 | Romiti |
| 2011/0005944 | A1 | 1/2011 | Woolery |
| 2011/0308048 | A1 | 12/2011 | Raccah |
| 2013/0055578 | A1 | 3/2013 | Johns |
| 2013/0126541 | A1 | 5/2013 | Woolery |
| 2014/0020256 | A1 | 1/2014 | Rubin |
| 2018/0120074 | A1 | 5/2018 | Orsini et al. |

\* cited by examiner

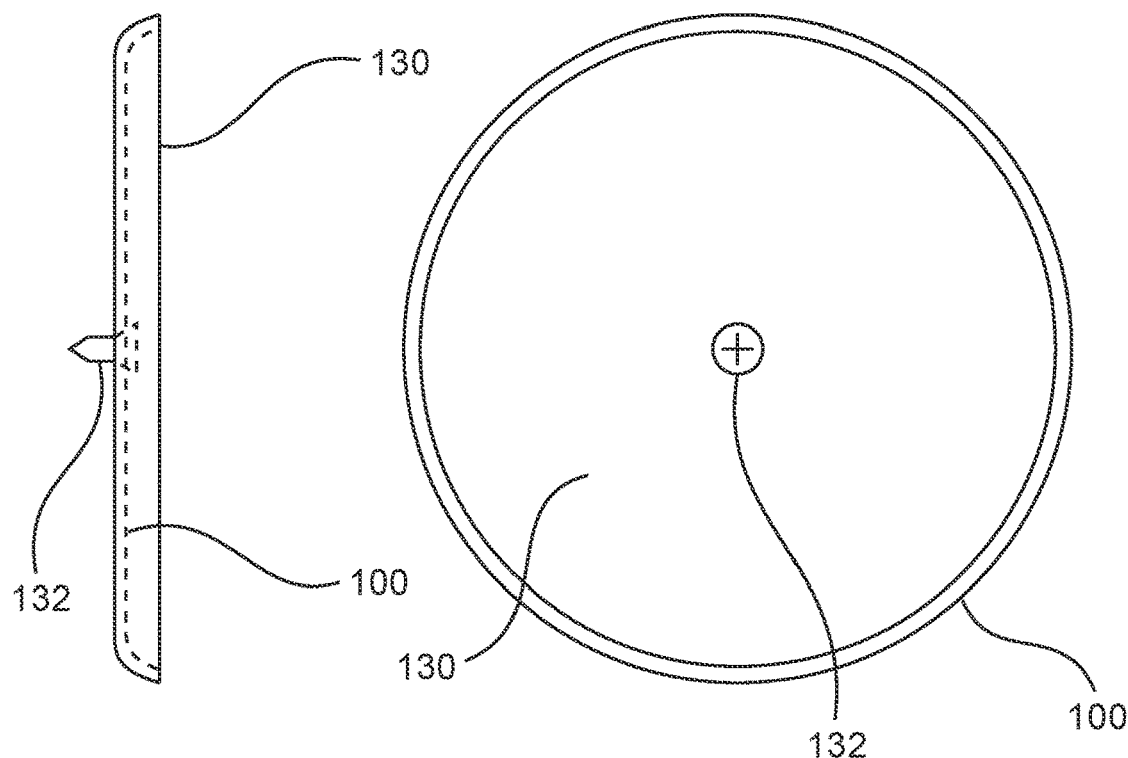
FIG. 13
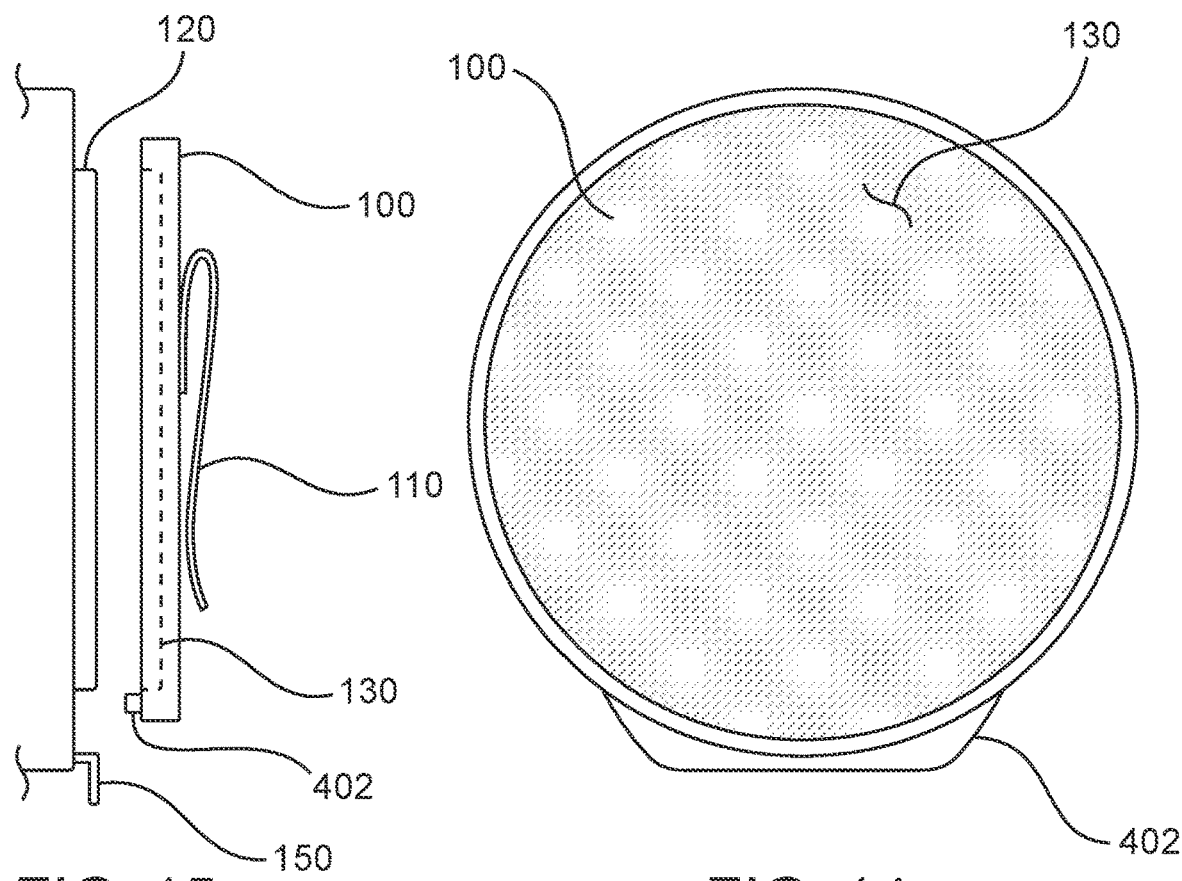
FIG. 15
FIG. 14

MAGNETIC TAPE MEASURE MOUNT

CROSS REFERENCE TO RELATED APPLICATIONS

This application is a continuation-in-part (CIP) application of U.S. Ser. No. 16/282,668, now U.S. Pat. No. 11,029,136, entitled MAGNETIC TAPE MEASURE MOUNT filed on Feb. 22, 2019 which claims the benefit of priority of U.S. 62/633,872 filed on Feb. 22, 2018. The contents of the above applications are incorporated by reference in their entirety.

FIELD OF THE INVENTION

The present invention is directed to systems and methods for manufacturing, implanting and using a magnetic tape measure mount to secure a tape measure or other related instrument magnetically to a user, to a user's waistline/belt line, or work belt.

BACKGROUND OF THE INVENTION

Tape measures are used for many industrial and construction jobs. Often a construction foreman and workers carry a tape measure in order to measure the dimensions of the job and its components, especially if job involves carpentry, woodworking or construction where measurements are required to be precise and defined.

Disadvantageously however, current tape measures are often lost or are inaccessible during a job when they are needed. For example, when working on a ladder, and when a worker is required to hold multiple tools, tape measures are often forgotten or left behind, thus, requiring the user to descend from the ladder and find a tape measure. This often wastes time and is inefficient.

Existing systems for tape measure designs include: U.S. Pat. Nos. 9,167,884, 9,038,873, 8,966,778, 8,516,621, 8,499,986, 8,499,943, 8,403,140, 7,971,277, 7,431,251, 7,374,142, 7,322,068, 7,269,869, 7,114.592, 7,076,885, 6,824,028, 6,685,067, 6,658,756, 6,502,727, 6,457,252, 6,401,253, 6,267,277, 6,161,741, 6,149,116, 5,213,240, 5,025,966, 4,736,877, 3,233,802, 3,371,00, US20140020256, US20130126541, US20110308048, US20110005944, US20100095427, US20100025442, US20040232291, US20050145656, US20050268480, US20070099469, US20090094801, US20090095785, US20090145938 and US20090314813.

However, no existing system provides a tape measure mount that is magnetically mounted to offer increased ease of access to the tape measure.

Naturally occurring minerals called "magnetites" were first discovered by ancient Greeks in the area of modern Turkey. Later, these "lodestones" were used by Vikings to build rudimentary naval compasses which helped navigate seas and through poor weather conditions.

Little did the Vikings know that magnetic fields are produced by moving electric charges and the intrinsic magnetic moments of elementary particles associated with a fundamental quantum property, that is by "particle electron spin". Magnetic fields and electric fields are interrelated both being components of electromagnetism, one of the four fundamental forces of nature; the other forces being gravity, the weak nuclear interaction/force, and the strong nuclear interaction/force.

A permanent magnet may be defined as a material or object that exhibits and maintains a magnetic flux density field not produced by an active current flow through a wire or coil; in which the permanent magnet "attracts" or is "cohesive with" magnetic flux field conductive materials. That is, a permanent magnet is attracted to or coheres with a material via electromagnetic flux density conduction. Magnetic fields "seek to find" the easiest or shortest route from a magnetic flux field north pole to a magnetic flux field south pole, and vice versa.

The strength of a magnetic flux field is expressed in units of Tesla (T) or microtesla ($\mu$T). Another commonly used unit of measure is the Gauss (G) or milligauss (mG), where 1 G is equivalent to 10-4 T (or 1 mG=0.1 $\mu$T).

The degree to which a material conducts a magnetic flux density field is known as the material's magnetic coherence or reluctance. Something made entirely of wood, would have a high magnetic reluctance or a low magnetic coherence. As evidenced using a bar magnet and iron shavings as reminiscent of secondary school science experiments; even air conducts magnetic flux fields.

Modernly, magnets are found almost everywhere; in computers, in audio speakers, in "ear buds", as credit card magnetic strips, in smart devices, in implantable medical devices, in magnetic resonance imaging systems, on most refrigerator doors, and even with earrings and the like.

Almost all magnets are manufactured using various natural materials, the most magnetically powerful known as "rare earth" magnets. Rare-earth elements, also called the rare-earth metals or oxides, are a group of seventeen nearly indistinguishable lustrous silvery-white soft heavy metals. Scandium and yttrium are considered rare-earth elements because they tend to occur in the same ore deposits as lanthanides and exhibit similar chemical properties; but, have different electronic and magnetic properties.

These metals, in pure form, tarnish slowly in air at room temperature, and react slowly with cold water to form hydroxides, liberating hydrogen. They react with steam to form oxides, and at elevated temperature (4000 degrees Celsius) ignite spontaneously and burn with a fierce colorful pyrotechnic flame.

Samarium cobalt magnets are a type of rare earth magnet constructed from an alloy of samarium and cobalt; and can retain magnetic coercivity in high temperature environments up to 300 degrees Celsius. However, samarium cobalt magnets are extremely brittle and crack very easily thus making application specialized and limited.

Alnico is a ferromatic material used to make permanent magnets, produces strong magnetic fields, and is a more commonly available magnet type. Traditionally these magnets are most known for their red color and popularity as horseshoe and bar magnets used in education.

Common ceramic magnets typically come in two types; ridged and flexible. Soft ferromagnetic ceramic compounds are typically of low magnetic coherence; while hard or ridged ceramic compounds are typically of high magnetic coherence and very resistant to losing their magnetism. Ceramic magnets are also well known for their low cost and ease of manufacture.

However, ceramic magnets tend to be heavy in relation to the magnetic flux density field they produce. Also, ridged ceramic magnets tend to be fragile and crack easily under high instantaneous gravity conditions (that is, when dropped, or the like).

Most natural and manufactured magnets are metallic in nature. So-called "rare earth" permanent magnets are now commonly available in a plurality of dimensions and field density strengths; with neodymium magnets being widely available and inexpensive to produce.

Utilizing advances is material sciences in relation to magnetic flux density field production and hysteresis; what is highly desired to provide a method and system that solves the disadvantages in the prior art.

SUMMARY OF THE INVENTION

It is an object of the present invention to provide a magnetically mounted tape measure that attaches to a user, to a user's waistline/belt line, or work belt.

It is an object of the present invention to provide methods and systems for manufacturing, implanting and using a magnetic tape measure mount to secure a tape measure or another related instrument magnetically to a user.

It is an object of the present invention to provide a mounting device that is adapted to retrofit conventional tape measures to be magnetically mounted.

These and other objects of the invention are achieved by providing a magnetic tape measure mount, comprising: a housing having a magnet encompassed within the housing; a fastening device configured to fasten the housing to the tape measure; and a metal mounting plate, the magnet configured to be attached to the metal mounting plate to secure the housing and tape measure to the metal mounting plate.

In certain embodiments, the metal mounting plate includes a clip configured to attach the metal mounting plate to a user's belt line, utility belt and/or pocket.

In certain embodiments, the clip is welded or riveted to the metal mounting plate. In certain embodiments, the clip is attached via a fastening device to the mounting plate. In certain embodiments, the fastening device includes 2 recessed flat head screws with nuts and/or lockwashers.

In certain embodiments, the metal mounting plate includes a ridge at the bottom of the metal mounting plate, so that the housing is secured against the metal mounting plate and is held in place by the ridge to prevent the tape measure from rotating, being dislodged or sliding off if it happens to be placed too low on the plate.

In certain embodiments, the ridge extends perpendicularly to the metal mounting plate.

In certain embodiments, the ridge extends and completely surrounds a tape measure.

In certain embodiments, the magnet has a doughnut shape.

In certain embodiments, the proximal side of the housing abuts the tape measure, and the distal side of the housing faces the metal mounting plate.

In certain embodiments, the metal mounting plate has a surface area larger than the magnet.

In certain embodiments, the fastening device is a screw.

In certain embodiments, the metal mounting plate is round.

In certain embodiments, the housing includes a washer-type shape.

In certain embodiments, the magnet includes enough strength to attach to the metal mounting plate during use and wear of the tape measure.

Other objects of the invention are achieved by providing a kit to retrofit an existing tape measure, the kit comprising: a housing having a magnet encompassed within the housing; a fastening device configured to fasten the housing to an existing tape measure; and a metal mounting plate, the magnet configured to be attached to the metal mounting plate to secure the housing and tape measure to the metal mounting plate.

Other objects of the invention are achieved by providing a method to retrofit an existing tape measure to be magnetically mounted, the method comprising: providing a tape measure having a clip; unscrewing the clip from the tape measure, providing a magnetic tape measure mount comprising: a housing having a magnet encompassed within the housing, a fastening device configured to fasten the housing to the tape measure, and a metal mounting plate, the magnet configured to be attached to the metal mounting plate to secure the housing and tape measure to the metal mounting plate; and securing the magnetic tape measure mount to the tape measure.

Other objects of the invention are achieved by providing a magnetic tape measure mount, comprising: a first housing having a first magnet encompassed within the first housing; a fastening device configured to fasten the first housing to the tape measure; and a belt clip assembly comprising an upper portion and a lower portion, the lower portion comprising a second magnet, and wherein the first and second magnet are configured to be attracted to each other and self-center the tape measure to the second magnet.

In certain embodiments, the mount further comprises an arc-shaped shroud located on an upper portion of the first housing; and a second housing for the second magnet, the second housing comprising an arc shaped tab, the arc shaped tab of substantially similar size as the arc-shaped shroud, and the arc-shaped tab forming a recess with a surface of the lower portion of the belt clip assembly, and within which a portion of the shroud can interface and interlock with.

In certain embodiments, the upper portion of the belt clip assembly is formed at an angle in regard to the lower portion.

In certain embodiments, the belt clip assembly comprises a clip attached to the upper portion and configured to attach the belt clip assembly to a user's waistline/belt line or work belt.

In certain embodiments, the first housing is substantially cylindrical in shape, and configured to accept the first magnet within an interior portion of the first housing.

Other embodiments of the invention are achieved by providing a magnetic tape measure mount, comprising: a first housing having a first magnet encompassed within the first housing; a belt clip assembly comprising an upper portion and a lower portion, the first housing attached to the lower portion; a shroud plate configured to be attached to the tape measure, the shroud plate comprising an arc-shaped shroud located on an upper portion of the shroud plate and configured to receive the first housing when the tape measure is attached to the first magnet.

In certain embodiments, the upper portion of the belt clip assembly is formed at an angle in regard to the lower portion.

In certain embodiments, the belt clip assembly comprises a clip attached to the upper portion and configured to attach the belt clip assembly to a user's waistline/belt line or work belt.

In certain embodiments, the first housing is substantially cylindrical in shape, and configured to accept the first magnet within an interior portion of the first housing.

Other embodiments of the invention are achieved by providing a tape measure safety mounting assembly comprising: a keeper plate comprising a hole; a clasp attached to the tape measure; and a safety clip assembly configured to attach to the clasp on the tape measure and to attach to the hole on the keeper plate such that the tape measure is attached to the keeper plate by the safety clip assembly.

In certain embodiments, the keeper plate is further configured to be removably attachable to an article of clothing of a user.

In certain embodiments, the keeper plate comprises a clip attached to a first side of the keeper plate.

In certain embodiments, the clip is located at an upper portion of the keeper plate.

In certain embodiments, the hole is located at a lower portion of the keeper plate.

In certain embodiments, the safety clip assembly comprises: a first and second spring loaded safety clip, the first and second spring loaded safety clips connected by a cable.

In certain embodiments, the tape measure safety mounting mechanism further comprises a magnet attached to the tape measure; and a ridge located on a lowermost portion of the keeper plate.

In certain embodiments, the ridge is configured to maintain spacing between the tape measure and the hole to which the safety clip assembly is attached.

In certain embodiments, the ridge is configured to prevent the tape measure from being dislodged and/or rotating.

In certain embodiments, the ridge extends perpendicularly to the keeper plate.

In certain embodiments, the ridge completely surrounds the tape measure.

In certain embodiments, the magnet has a doughnut shape.

In certain embodiments, the magnet includes enough strength to attach to the keeper plate during use and wear of the tape measure.

Other objects of the invention are achieved by providing a magnetic tape measure mount, comprising: a housing having a permanent magnet encompassed within the housing; a fastening device configured to fasten the housing to the tape measure; and a magnetically coherent mounting plate; the permanent magnet configured to be magnetically cohesive with the magnetically coherent mounting plate to releasably secure the housing and tape measure to the magnetic coherent mounting plate; wherein when the housing is placed in proximity to the magnetically coherent mounting plate the permanent magnet within the housing provides a magnetic flux density sufficient to support the weight of the tape measure after attraction by and adherence to the housing; whereby the tape measure is removably affixed to the magnetically coherent surface.

In certain embodiments, the magnetically coherent mounting plate includes a clip configured to attach the magnetically coherent mounting plate to a user's waistline/belt line, or work belt.

In certain embodiments, the clip is welded or riveted to the magnetically coherent mounting plate.

In certain embodiments, the magnetically coherent mounting plate includes a ridge at the bottom of the magnetically coherent mounting plate, so that the housing is secured against the magnetically coherent mounting plate and abuts the ridge to prevent the tape measure from being dislodged and/or from rotating.

In certain embodiments, the ridge extends perpendicularly to the magnetically coherent mounting plate.

In certain embodiments, the ridge completely surrounds the tape measure.

In certain embodiments, the permanent magnet has a doughnut shape.

In certain embodiments, the proximal side of the housing abuts the tape measure, and the distal side of the housing faces the magnetically coherent mounting plate.

In certain embodiments, the magnetically coherent mounting plate has a surface area larger than the permanent magnet.

In certain embodiments, the fastening device is a screw.

In certain embodiments, the magnetically coherent mounting plate is round with a flat bottom edge.

In certain embodiments, the housing includes a disc shape.

In certain embodiments, the permanent magnet provides sufficient magnetic flux density to releasably secure the tape measure and housing to the magnetically coherent mounting plate during use and wear of the tape measure by the user.

In certain embodiments, the permanent magnet is from the group consisting of rare earth elements, neodymium, ceramics, and combinations thereof.

In certain embodiments, the housing comprises a plastic, a silicone rubber, or a metal and is resistant and/or impervious to air and water intrusion.

In certain embodiments, a housing is removable from the tape measure and replaceable with a housing containing a permanent magnet of a differing magnetic flux density.

In certain embodiments, the whole keeper plate comes off when rolling the wrist downward to remove the magnetic tape measure from the metal keeper plate) if the clip isn't placed higher toward the top of the keeper plate.

In certain embodiments, the device includes an eyebolt screw for the safety clasp.

Other objects of the invention are achieved by providing a kit to retrofit an existing tape measure, the kit comprising: a housing having a permanent magnet encompassed within the housing; a fastening device configured to fasten the housing to the existing tape measure; and a magnetically coherent mounting plate, wherein the permanent magnet is configured to provide sufficient magnetic flux density to attract and cohere to the magnetically coherent mounting plate releasably securing the housing and tape measure to the magnetically coherent mounting plate.

Other objects of the invention are achieved by providing a method to retrofit an existing tape measure to be magnetically mounted, the method comprising: providing a tape measure having a clip; removing the clip from the tape measure, providing a magnetic tape measure mount comprising: a housing having a permanent magnet encompassed within the housing, a fastening device configured to fasten the housing to the tape measure, and a magnetically coherent mounting plate, the permanent magnet configured to cohere to the magnetically coherent mounting plate to secure the housing and tape measure to the magnetically coherent mounting plate; and releasably securing the magnetic tape measure mount to the tape measure.

Other objects are achieved by providing a magnetic tape measure mount, comprising: a housing having a magnet encompassed within the housing; a fastening device configured to fasten the housing to the tape measure; and a magnetically coherent mounting plate, the magnet configured to adhere to the magnetically coherent mounting plate to secure the housing and tape measure to the magnetically coherent mounting plate.

In certain embodiments, the magnetically coherent mounting plate includes a clip configured to attach the magnetically coherent mounting plate to a user's belt line, utility belt and/or pocket.

In certain embodiments, the clip is welded or riveted to the magnetically coherent mounting plate.

In certain embodiments, the magnetically coherent mounting plate includes a ridge at the bottom of the magnetically coherent mounting plate, so that the housing is secured against the magnetically coherent mounting plate and is held in place by the ridge to prevent the tape measure from rotating, being dislodged or sliding off if it happens to be placed too low on the plate.

In certain embodiments, the ridge extends perpendicularly to the magnetically coherent mounting plate.

In certain embodiments, the ridge extends and completely surrounds a tape measure.

In certain embodiments, the permanent magnet has a doughnut shape.

In certain embodiments, the permanent magnet has a disc shape.

In certain embodiments, the proximal side of the housing abuts the tape measure, and the distal side of the housing faces the magnetically coherent mounting plate.

In certain embodiments, the magnetically coherent mounting plate has a surface area larger than the permanent magnet.

In certain embodiments, the fastening device is a screw.

In certain embodiments, the magnetically coherent mounting plate is round.

In certain embodiments, the housing is a disc shape.

In certain embodiments, the permanent magnet includes enough strength to attach to the magnetically coherent mounting plate during use and wear of the tape measure.

Other objects of the invention are achieved by providing a kit to retrofit an existing tape measure, the kit comprising: a housing having a permanent magnet encompassed within the housing; a fastening device configured to fasten the housing to an existing tape measure; and a magnetically coherent mounting plate, the permanent magnet configured to adhere to the magnetically coherent mounting plate to secure the housing and tape measure to the magnetically coherent mounting plate.

Other objects of the invention are achieved by providing a method to retrofit an existing tape measure to be magnetically mounted, the method comprising: providing a tape measure; removing any existing clip from the tape measure, providing a magnetic tape measure mount comprising: a housing having a permanent magnet encompassed within the housing, a fastening device configured to fasten the housing to the tape measure, and a magnetically coherent mounting plate, the permanent magnet configured to adhere to the magnetically coherent mounting plate to secure the housing and tape measure to the magnetically coherent mounting plate; and securing the magnetic tape measure mount to the tape measure.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 10-13 are schematic sketches of embodiments of the invention.

FIG. 14 illustrates a front view of a housing within which a magnet can be located with respect to the embodiment as shown in FIG. 1.

FIG. 15 illustrates a side view of a tape measure, a magnetically coherent mounting plate, a clip, and a housing within which a magnet can be located with respect to the embodiment as shown in FIG. 1.

FIGS. 23-27 illustrate a further embodiment of the invention.

DETAILED DESCRIPTION OF THE INVENTION

The contents of the Appendices (Appendix 1 and Appendix 2) are incorporated by reference into this specification in their entirety.

In the following description, numerous details are set forth for the purpose of explanation. However, one of ordinary skill in the art will realize that the invention may be practiced without the use of these specific details.

In certain embodiments, the inventive method and system comprises a magnetically mounted tape measure that attaches to the waistline/belt line, or work belt of a user.

In certain embodiments, the inventive method and system are for manufacturing, implanting and using a magnetic tape measure mount to secure a tape measure or other related instrument magnetically to a user.

In certain embodiments, a mounting device is provided that is adapted to retrofit conventional tape measures to be magnetically mounted.

These and other objects of the invention are achieved by providing a magnetic tape measure mount, comprising: a housing having a permanent magnet encompassed within the housing; a fastening device configured to fasten the housing to the tape measure; and a magnetically coherent mounting plate, the permanent magnet configured to adhere to the magnetically coherent mounting plate to secure the housing and tape measure to the magnetically coherent mounting plate.

In certain embodiments, the inventive method and system is capable of retrofitting an existing tape measure to be magnetically mounted.

Figure 1:
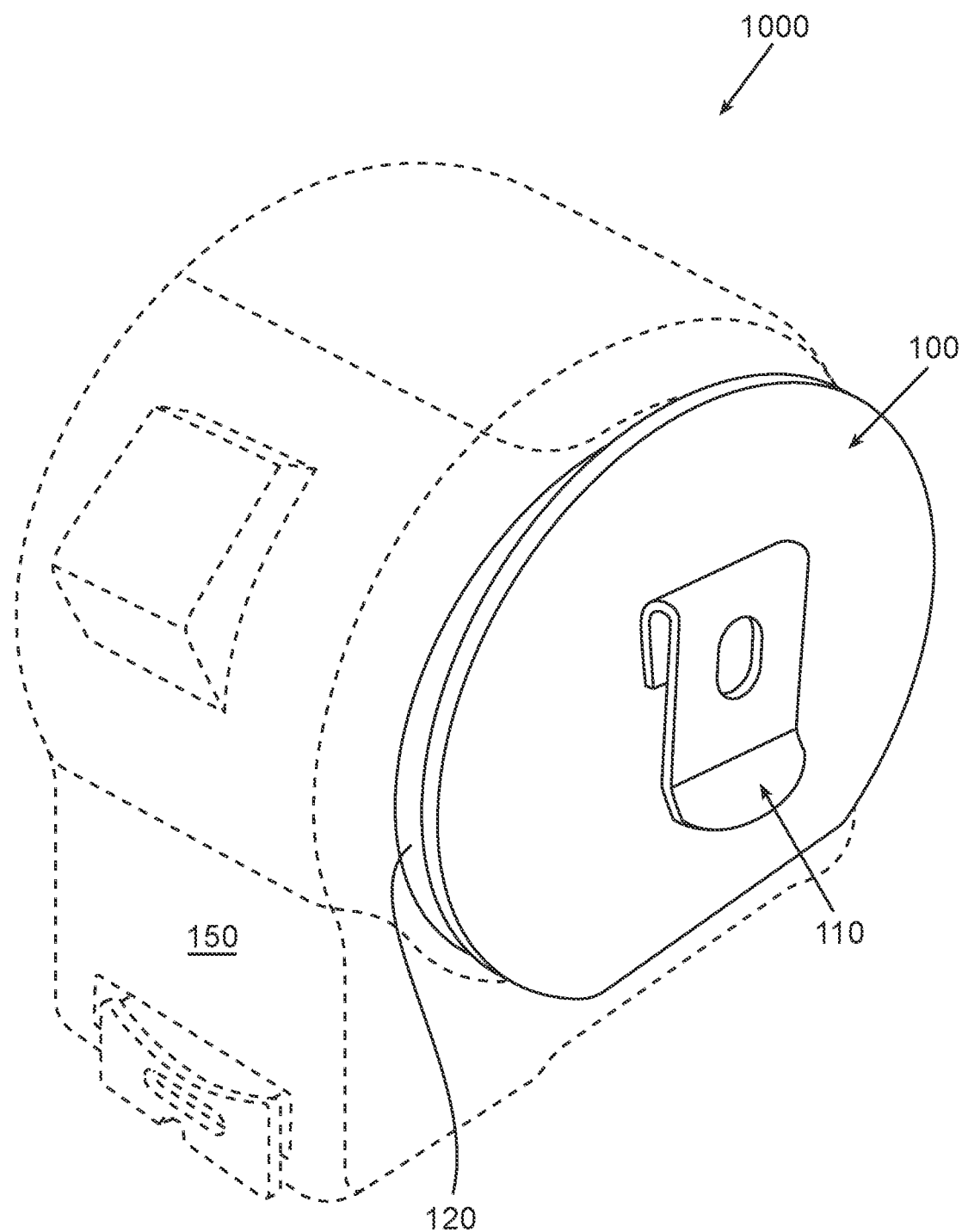
FIG. 1 is a front isometric view of an embodiment of the invention.
Figure 2:
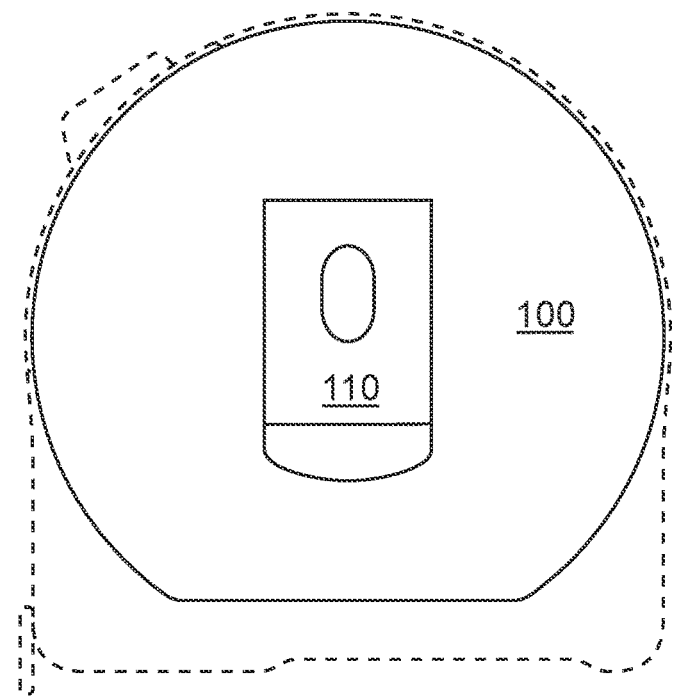
FIG. 2 is a front view of FIG. 1.
Figure 3:
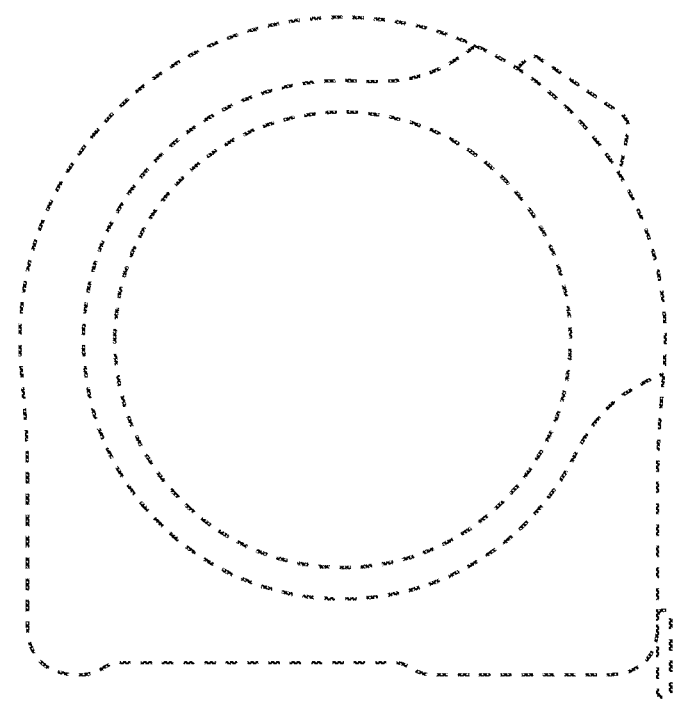
FIG. 3 is a rear view of FIG. 1.
Figure 4:
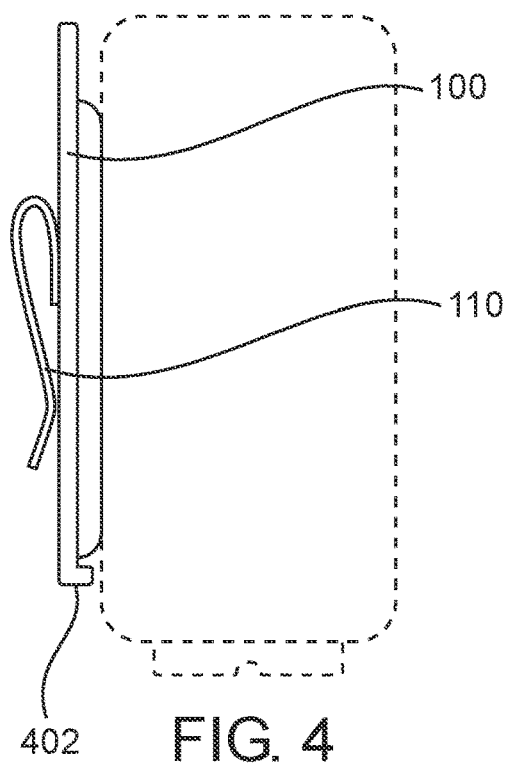
FIG. 4 is a right-side view of FIG. 1.
Figure 5:
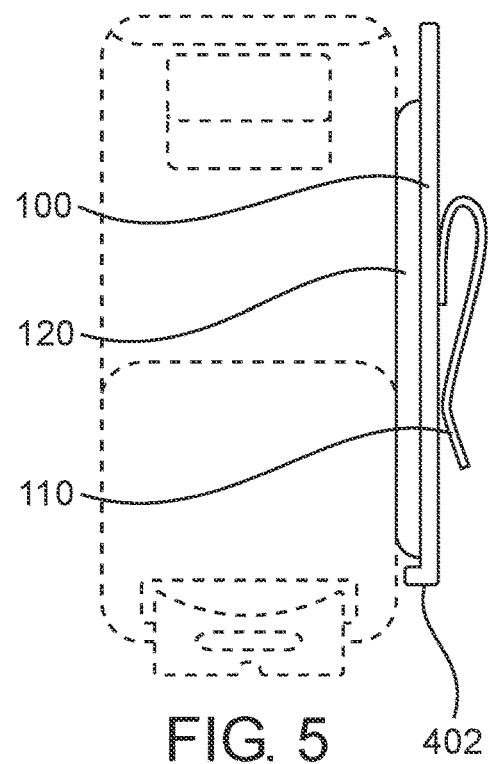
FIG. 5 is a left side view of FIG. 1.
Figure 6:
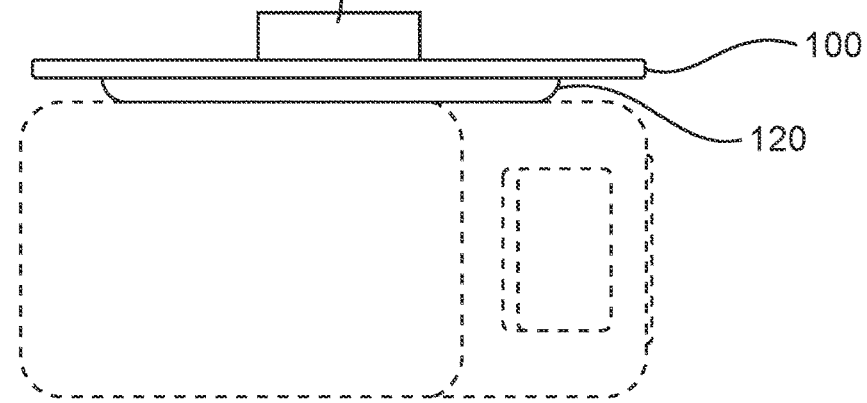
FIG. 6 is a top view of FIG. 1.
Figure 7:
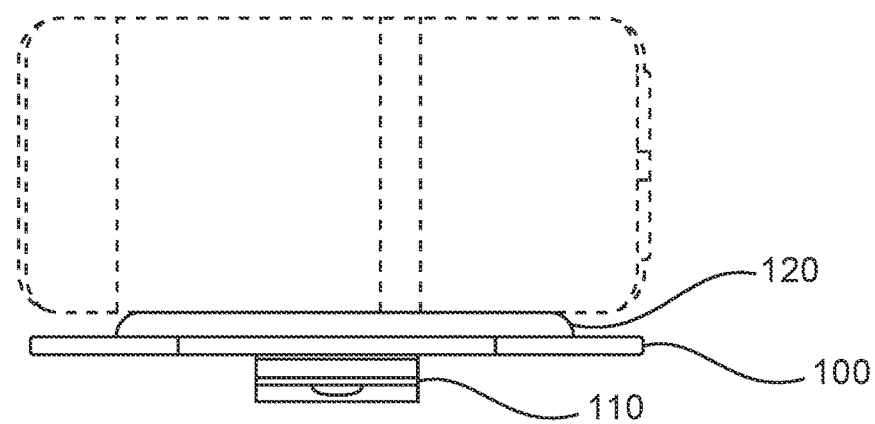
FIG. 7 is a bottom view of FIG. 1.

As depicted in FIGS. 1-7, and 14-15, an embodiment of the invention is shown. Magnetically coherent mounting plate 120, which is connected to tape measure 150, is shown connected to housing 100 that includes permanent magnet 130. A clip 110 is shown welded to housing 100. FIG. 14 illustrates a front view of housing 100 within which permanent magnet 130 can be located with respect to the embodiment as shown in FIG. 1, and FIG. 15 illustrates a side view of tape measure 150, magnetically coherent mounting plate 120, clip 110, and housing 100 within which permanent magnet 130 can be located with respect to the embodiment as shown in FIG. 1. Housing 110 further comprises ridge 402 as shown in FIGS. 4, 5, 14, and 15.

Figure 8:
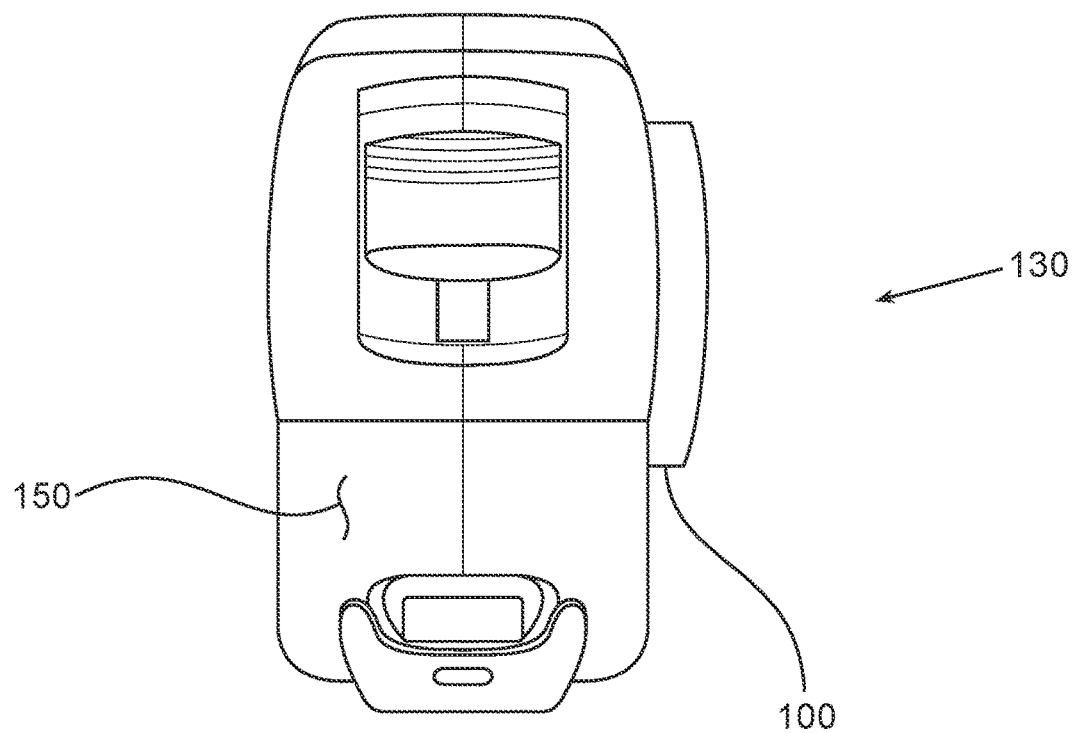
FIGS. 8-9 are schematic sketches of an embodiment of the invention.
Figure 9:
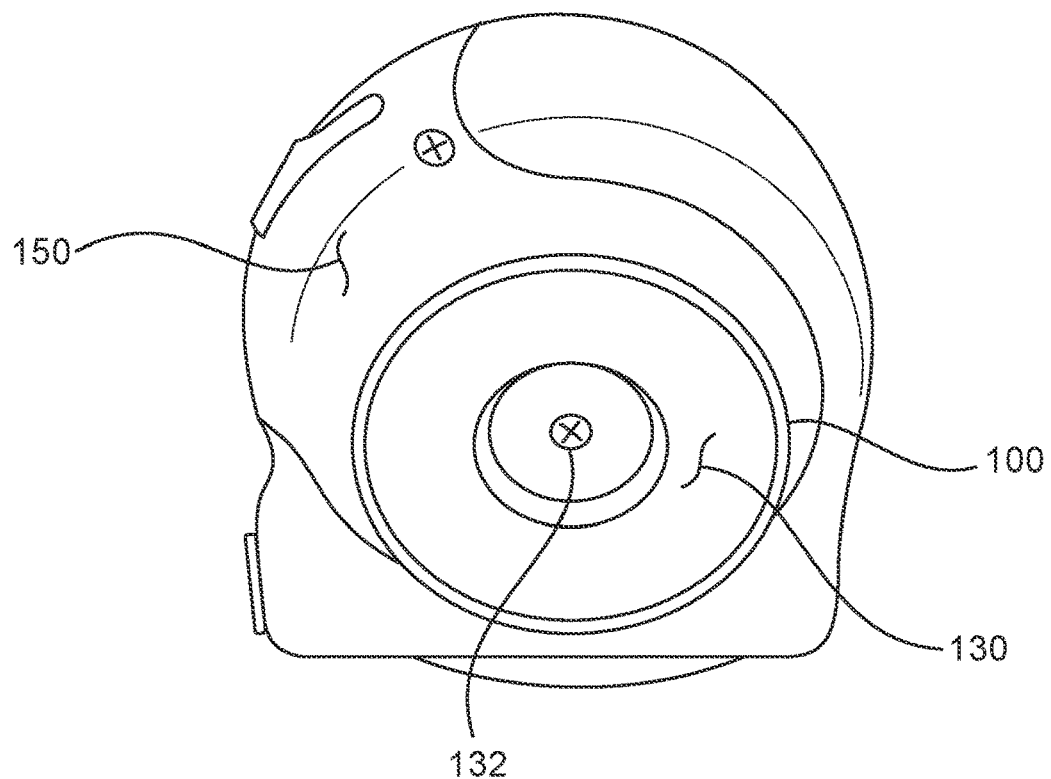

FIGS. 8-9 show another embodiment of the invention whereby a permanent magnet 130 is shown within an outer housing 100. The outer housing 100 with the permanent magnet 130 are shown attached to a tape measure 150 via a screw (fastening element) 132.

Figures 10, 11:
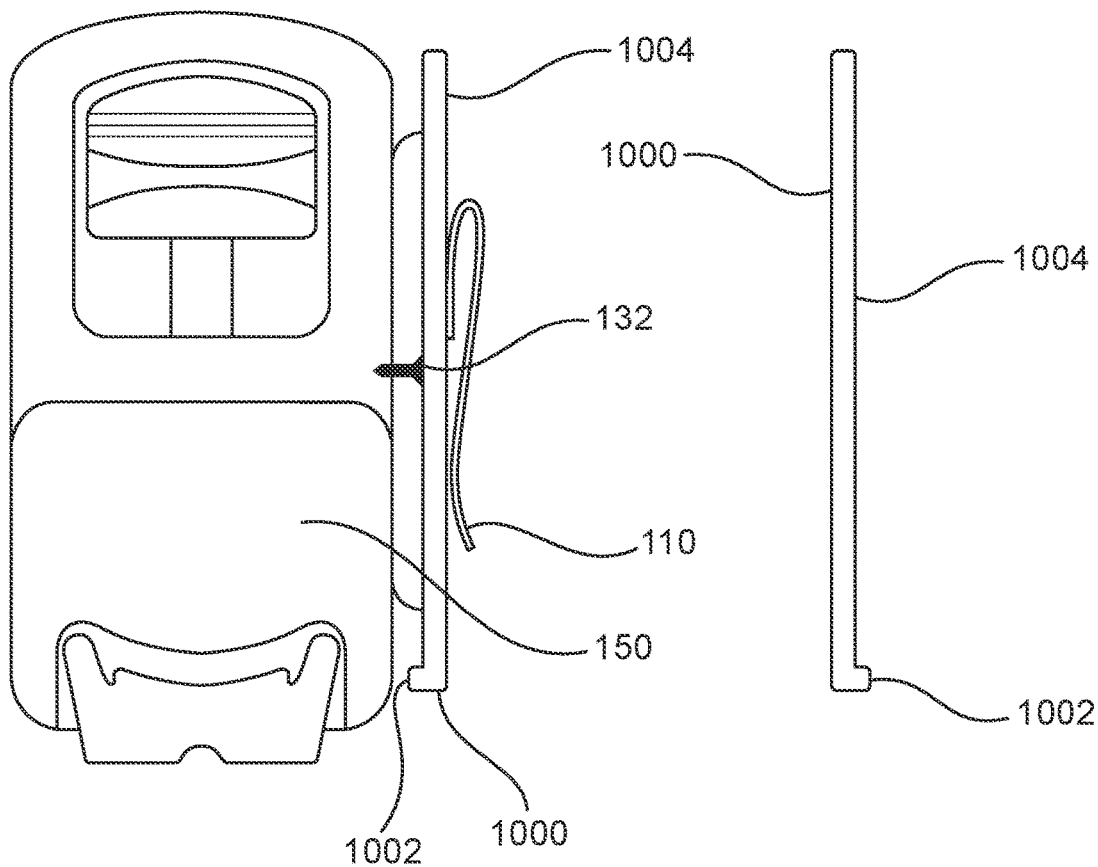

FIGS. 10-13 show schematic diagrams of an embodiment of the invention. In FIG. 10, a tape measure 150 is shown having a small ridge 1002 on magnetically coherent mounting clip plate 1000 for extra support, permanent magnet 130, clip 110, magnetically coherent mounting plate 120 and screw 132. Magnetically coherent mounting clip plate 1000 further comprises planar portion 1004 as shown in FIG. 10.

In certain embodiments, the permanent magnet 130 is screwed and glued to the housing body 100. In FIG. 11 the magnetically coherent mounting clip plate 1000 is shown having a ridge 1002 on the bottom for extra support and for preventing the tape measure 150 from rotating during use.

In certain embodiments, the circumference of the magnetically coherent mounting clip plate 1000 has a ridge 1002 that extends out about 1/8 of an inch that is perpendicular to the magnetically coherent mounting clip plate 1000.

Figure 12:
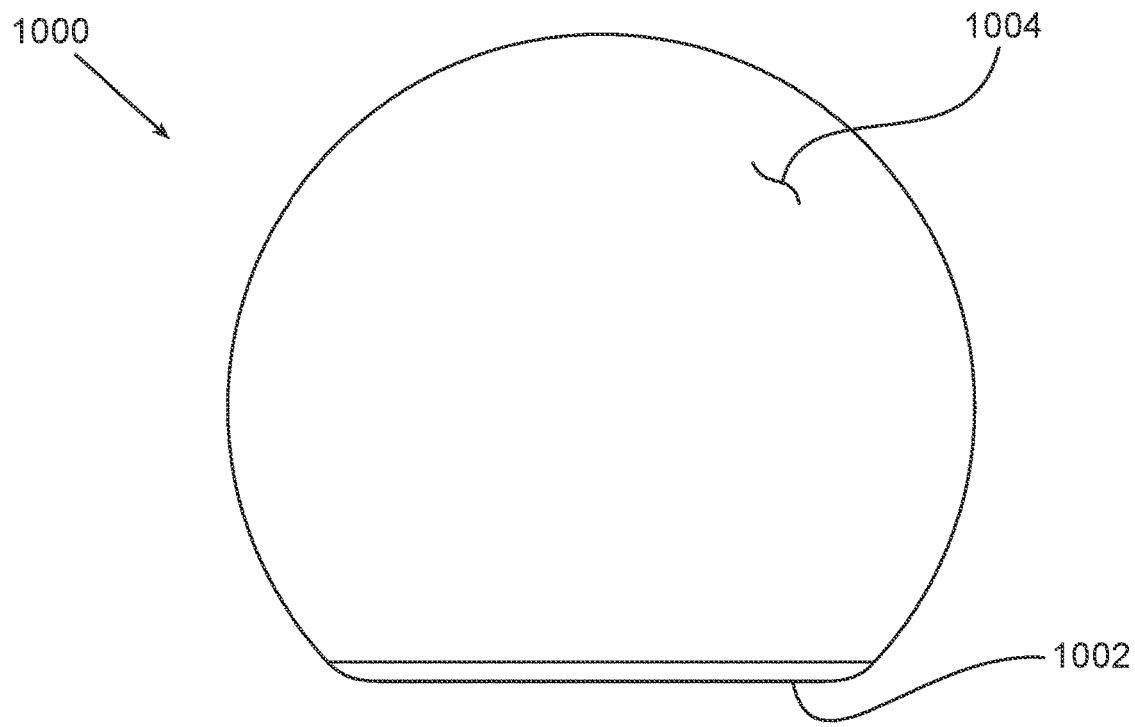

As shown in FIG. 12, in certain embodiments, the magnetically coherent mounting clip plate 1000 may have rounded edges (no sharp edges), in order to avoid catching on a user's clothes.

FIG. 13 shows a side view and front view of the permanent magnet 130 and housing 100 in detail. As shown, the permanent magnet 130 is located within the washer-like housing 100 and can use the existing screw 132 from the previous clip 110 to attach the permanent magnet 130 and housing 100 to the tape measure 150. The permanent magnet 130 is shown having a doughnut or disc shape with the fastening device 132 located within the doughnut or disc shape.

In certain embodiments, the invention includes a tape measure 150 that has had the clip 110 it normally comes with, unscrewed, taken off, and instead, has a housing 100 including a permanent magnet 130 put in the place where the clip 110 once was (a slightly longer screw and/or other fastening element 132 can be used according to aspects of the embodiments).

In certain embodiments, the permanent magnet 130 has a magnetically coherent washer assembly fused to it, on the side closest to the tape measure 150. The magnetically coherent mounting clip plate 1000 can be slightly larger than the tape measure 150 from its side face view, and has a small one-eighth inch, 90° angle ridge 1002, angling away from the body, on the bottom edge as an added protection to keep it from it sliding off.

In certain embodiments, the clip 110 that would normally be on the tape measure 150 is fused to the magnetically coherent mounting clip plate 1000 instead. The magnetically coherent mounting clip plate 1000 is kept clipped to the waistline or clipped to a belt-line when a person wants to use the tape measure 150.

To use the tape measure 150, the user simply removes the tape measure 150 by rolling his or her wrist downward to disengage the top part of the permanent magnet 130 first, following with the whole tape measure 150 releasing from the magnetically coherent mounting clip plate 1000. To put the tape measure 150 back on, the user simply adheres the permanent magnet 130 by directing the backside of the tape measure/magnet 150/130 toward the magnetically coherent mounting clip plate 1000. The permanent magnet 130 is magnetically attracted to the magnetically coherent mounting clip plate 1000, causing it to easily adhere. A reason the magnetically coherent mounting clip plate 1000 is a bit larger than the measuring tape 150, is so that the person using it need not have a perfect aim when magnetically attaching it to the magnetically cohesive mounting plate 1000 on their waistline or belt.

Figure 16:
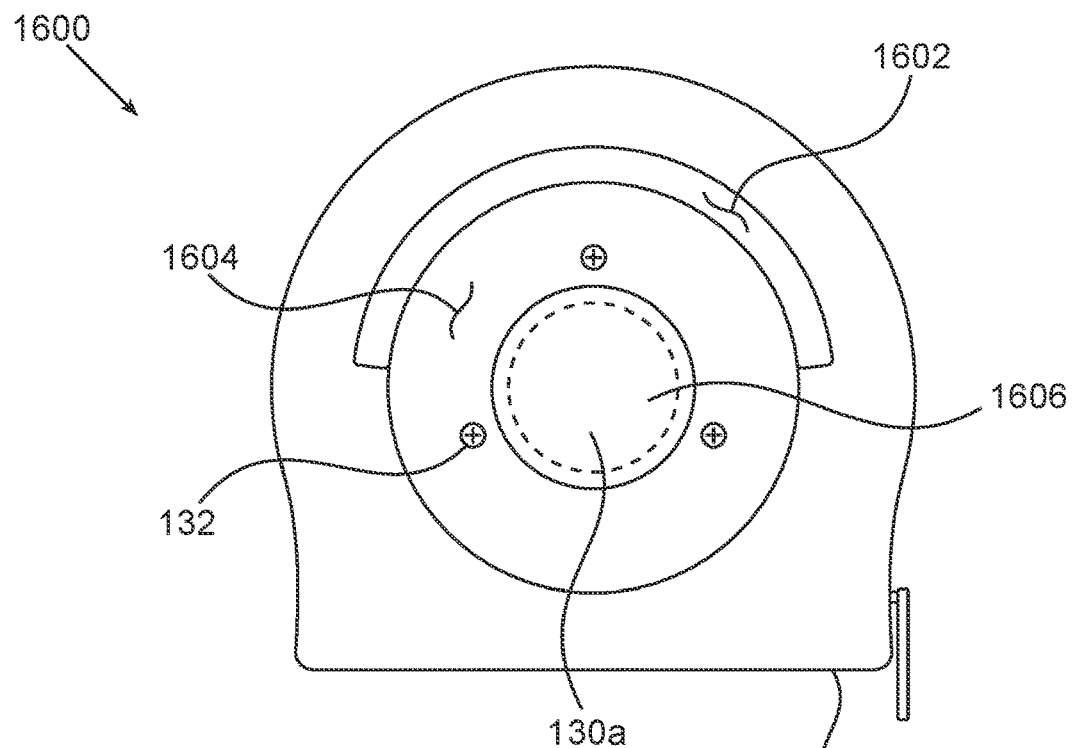
FIGS. 16-19 illustrate a further embodiment of the invention.

FIGS. 16-19 illustrate a further embodiment of the invention. FIG. 16 illustrates a front view of first assembly magnet-to-magnet tape measure retention means (first assembly) 1600 for magnetically removably retaining a tape measure 150 to a user via a belt clip assembly 1800. First assembly 1600 comprises a shroud 1602, a housing 1604, and a non-magnetic magnet retainer 1606.

Figure 17:
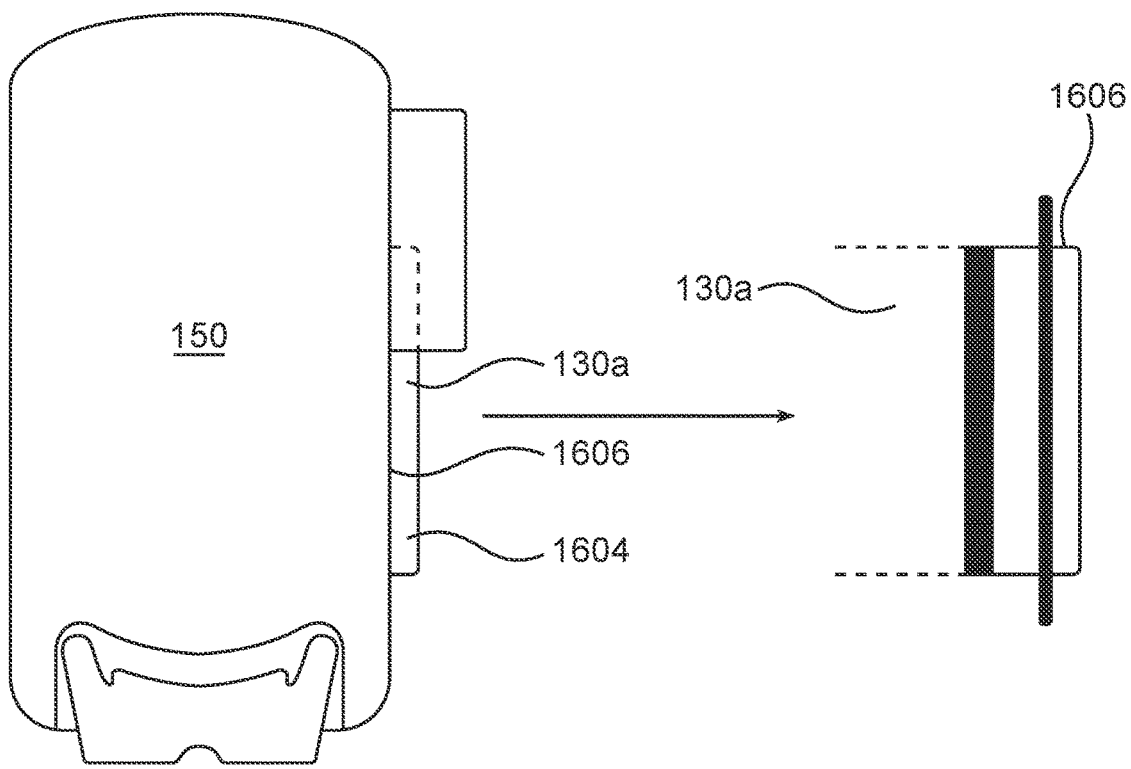

In operation, the magnet-to-magnet tape measure retention means provides a first permanent magnet 130a disposed on tape measure 150 via the housing 1604 and retainer 1606. As shown in FIG. 17, permanent magnet 130a fits within retainer 1606. Retainer 1606 is substantially cylindrical in shape, and is sized snuggly hold the first permanent magnet 130a; the retainer 1606 may be comprised of a non-magnetic material such as aluminum (among many other non-magnetic metals that can be used), and may have a lip that facilitates mounting onto tape measure 150. Located about the retainer 1606 is a plastic housing 1604 (note that the housing 1604 may be fabricated from other similar lightweight materials, such as carbon composites, fiberglass, and the like, among many other types of lightweight yet rugged materials). The screws/retention means 132 may be used to secure the entire assembly to tape measure 150. Located in an upper portion, as shown in FIGS. 17 and 18 is a shroud 1602, which provides an additional docking feature, as described in greater detail below.

Figure 18:
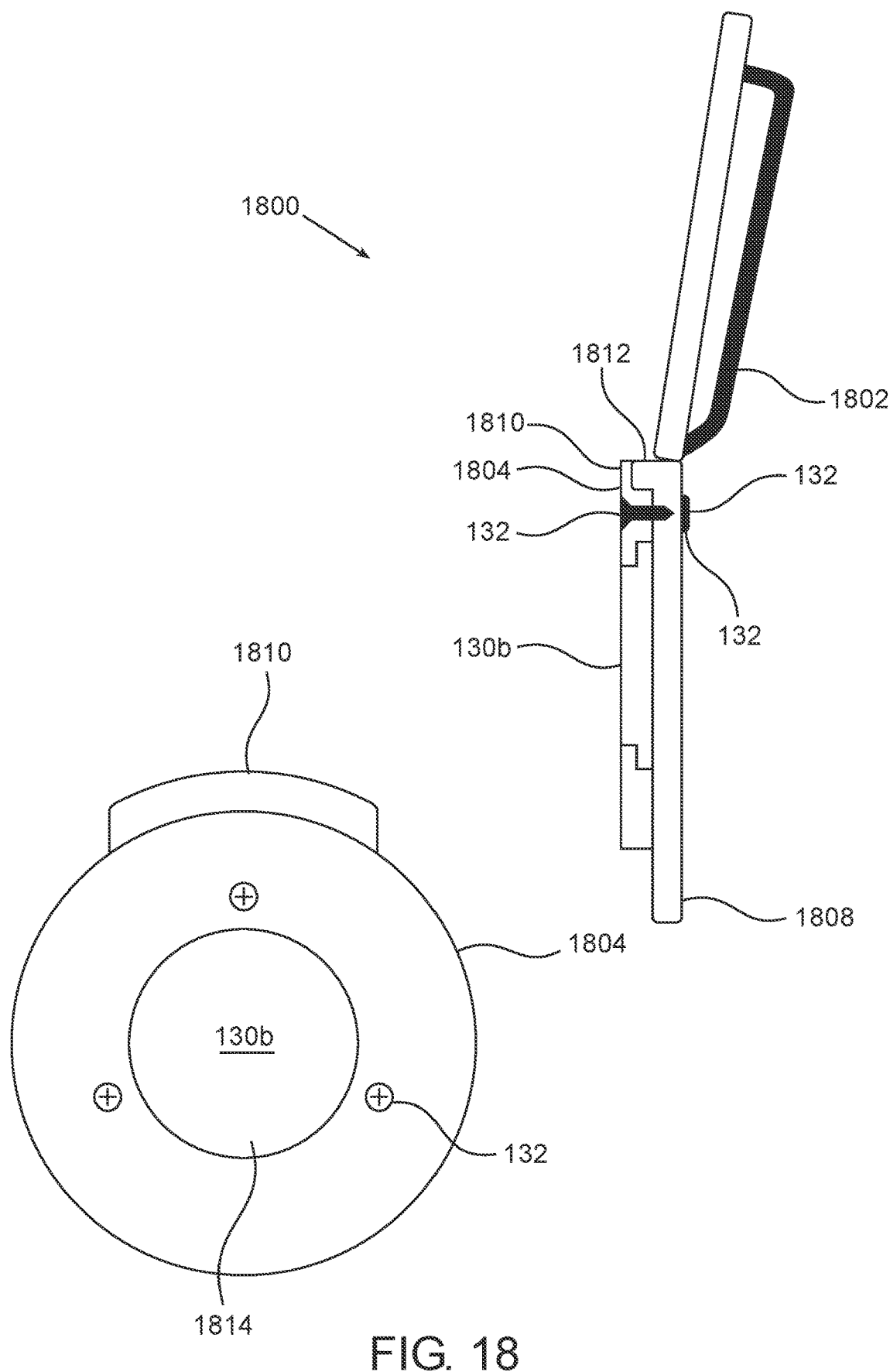
Figure 19:
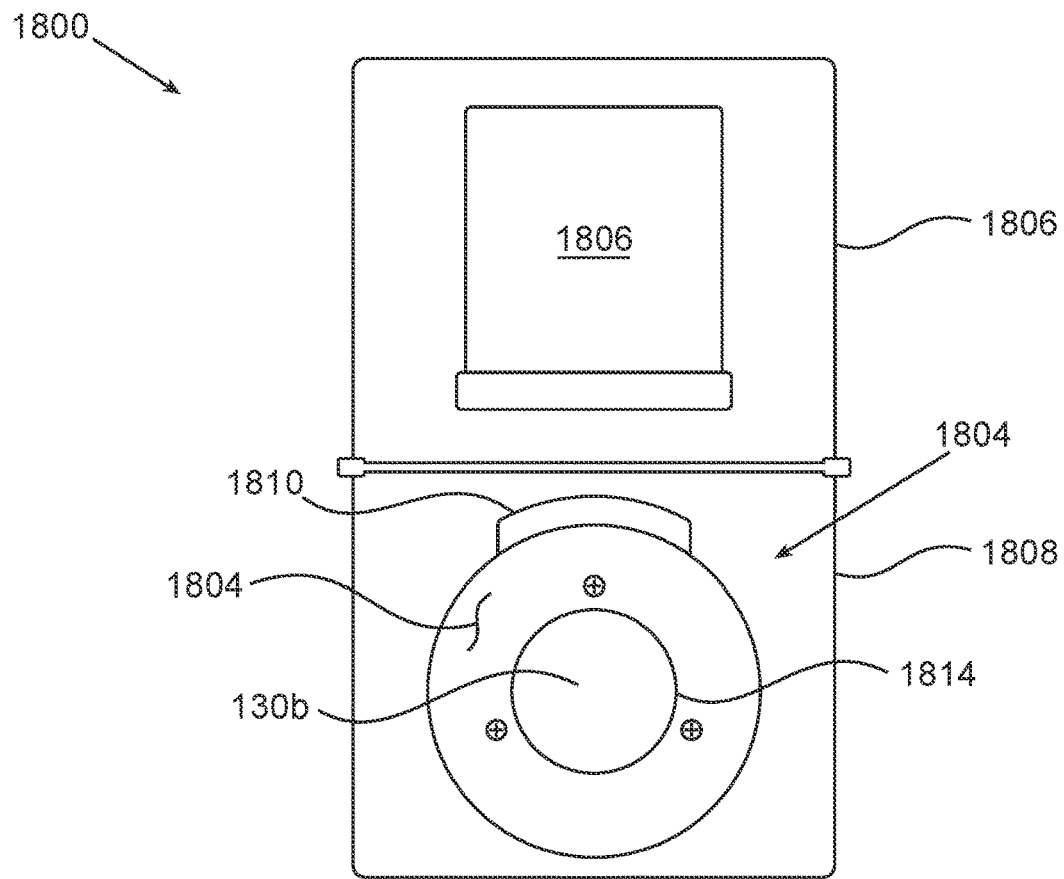

FIGS. 18 and 19 illustrate several views of a belt clip assembly 1800 that comprises the second portion or second assembly of the magnet-to-magnet tape measure retention means. A belt clip assembly 1800 comprises clip 1802 that can attach to a belt or waist portion of a user's pair of pants; work belt, or the like. The belt clip assembly 1800 may further comprise a bend of about 10° between an upper portion 1806 and a lower portion 1808, so that the lower portion 1808 extends outward and downwardly at such an angle which makes it easier for a user to attach the tape measure 150 with the first assembly 1600 to the lower portion 1808. Both the upper and lower portions 1806, 1808 may be substantially planar and of similar size.

The belt clip assembly 1800 may further comprise a non-magnetic magnet housing 1804, which contains a tab 1810, and a recess 1812 formed about an inner surface of the tab 1810. The recess 1812 and the tab 1810 are designed to interface with an inner portion of the shroud 1602; that is, the shroud 1602 fits over the tab 1810 and into the recess 1812 in a tongue-and-groove fashion. The belt clip assembly 1800 may further comprise a second permanent magnet 130b, which fits into a non-magnetic magnet housing 1804, and which is retained therein by a non-magnetic magnet retainer 1814. When a user moves the first assembly 1600 so that the shroud 1602 is moving into the recess 1812, the first permanent magnet 130a and the second permanent magnet 130b are mutually magnetically attracted to the other, and this mutual magnetic attraction draws them together in substantial alignment and in a self-centering manner with relatively little effort by the user, with the first permanent magnet 130a and the second permanent magnet 130b mutually and magnetically adhering to the other; and thus, constructively and removably attaching the tape measure 150 to a user's pants, work belt, and the like.

Figure 20A:
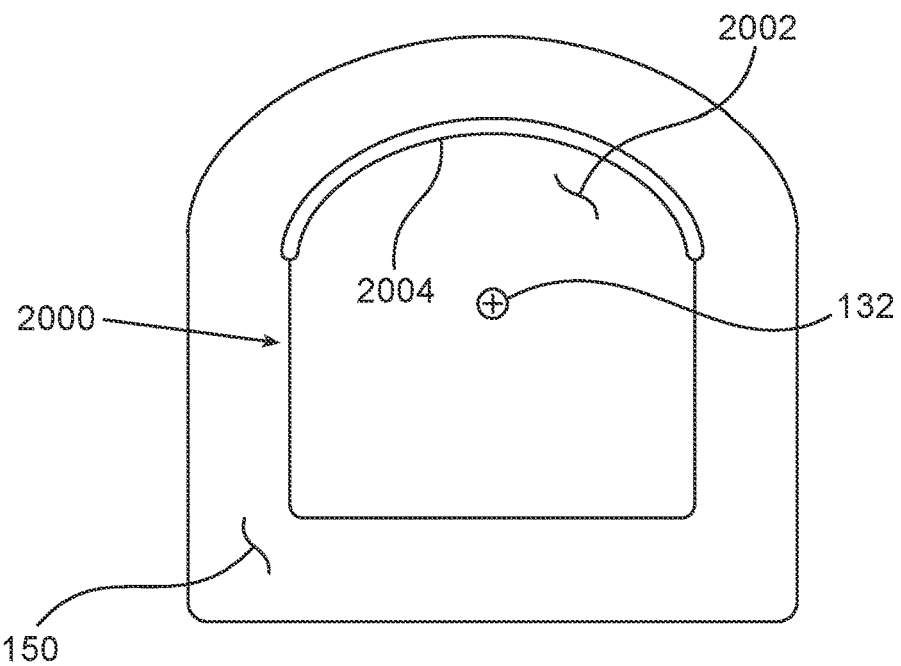
FIGS. 20A, 20B, and 21-22 illustrate a further embodiment of the invention.
Figure 20B:
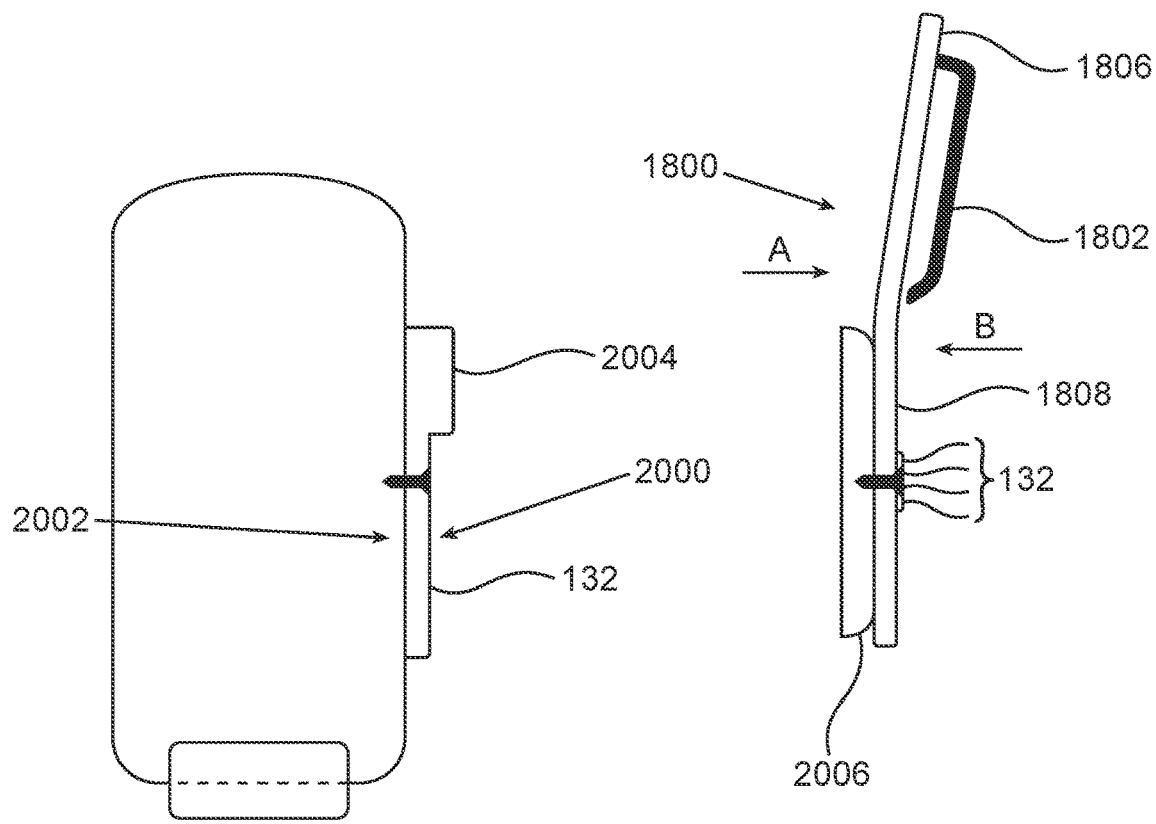
Figure 21:
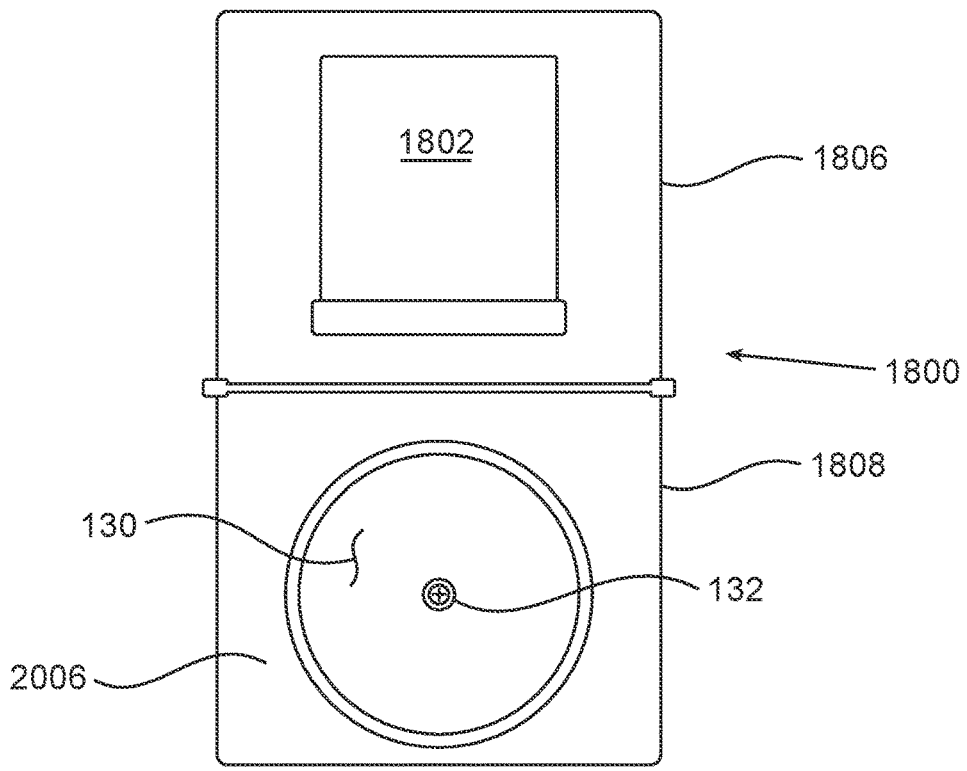
Figure 22:
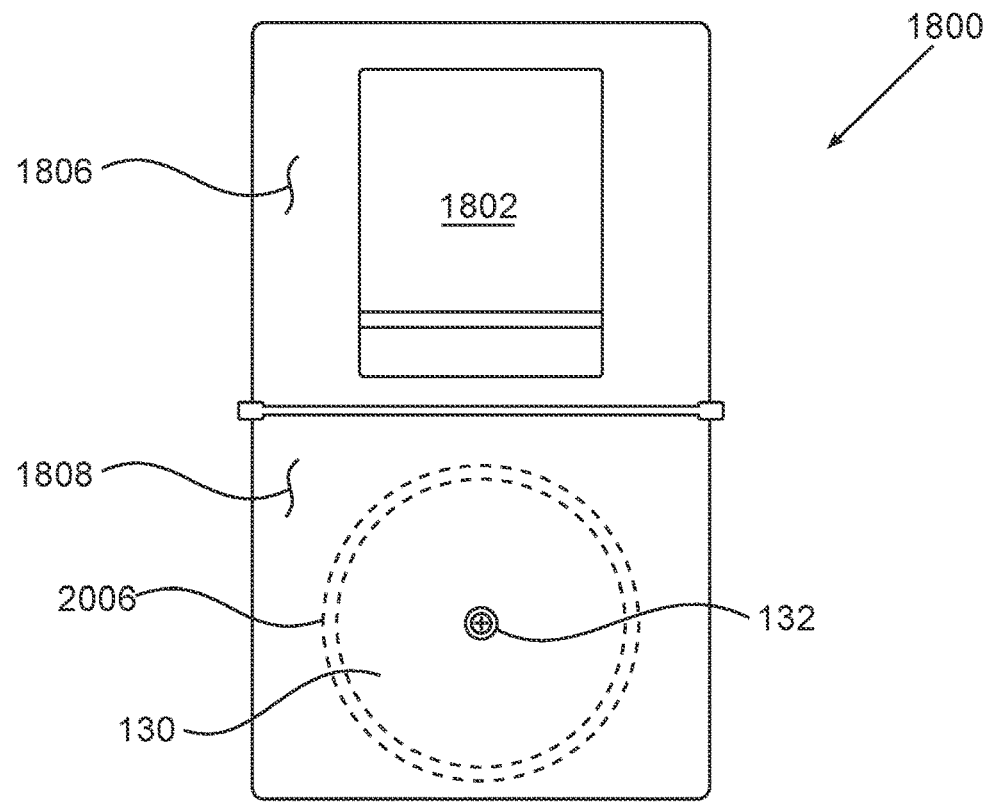

FIGS. 20-22 illustrate a further embodiment of the invention. In FIG. 20A there is shown a tape measure 150 with a tape measure shroud plate 2000 in a front view, and in FIG. 20B, there is shown a tape measure 150, a tape measure shroud plate 2000, and 1800 in a disassembled side view. The shroud plate 2000 comprises substantially a planar portion 2002 and a shroud portion 2004 and may take the place of the clip 110 on tape measure 150. In configuration, shroud portion 2004 is substantially similar in shape, size and functionality to the shroud 1602 as first shown in FIG. 16. According to aspects of the embodiments, the shroud plate 2000 is attached to a tape measure 150 via fastening element 132, in the manner shown in FIG. 20A.

In FIG. 20B there is shown a side view of a tape measure 150 with the shroud plate 2000 attached thereto, and with a modified belt clip assembly 1800. The belt clip assembly 1800 may be modified in that the non-magnetic magnet housing 2006 with a permanent magnet 130 located within has been added. A permanent magnet 130 may be contained in the housing 2006 by epoxy, or other retention means, and provides a magnetic flux density to releasably cohere a tape measure 150 to the belt clip assembly 1800, which is clipped onto a user's belt or pants in a substantially similar manner as described above in regard to FIGS. 16-19.

The housing 2006 may be attached to the belt clip assembly 1800 by a fastening element 132, which, in a non-limiting example, may be a screw with washer, and the like. The housing 2006 fits within the shroud 2004 to facilitate securing the tape measure 150 to the modified belt clip assembly 1800, and a permanent magnet 130 that is attached to the modified belt clip assembly 1800 magnetically attaches to a planar portion 2002 of the shroud plate 2000.

FIG. 21 illustrates a view in the direction of Arrow A in FIG. 20B, and FIG. 22 illustrates a view in the direction of Arrow B in FIG. 20B.

FIGS. 23-27 illustrates a further embodiment of the invention.

Figure 23:
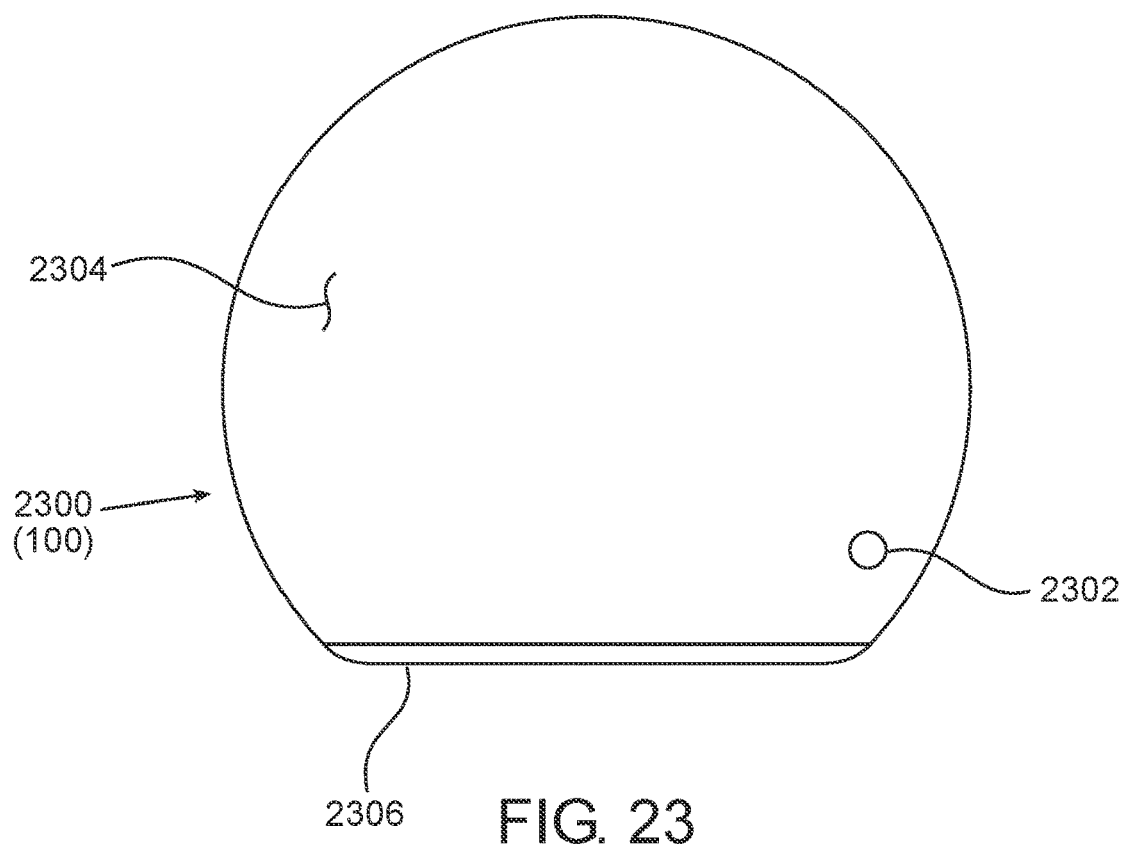

FIG. 23 illustrates a front view of a keeper plate 2300 according to aspects of the embodiments. The keeper plate 2300 may comprise a hole 2302, a planar portion 2304, and a ridge 2306 located at a bottom-most part of the planar portion 2304. The keeper plate 2300 is similar in structure and function as magnetically cohesive mounting clip plate 1000 as shown in FIGS. 10-13.

Figure 24:
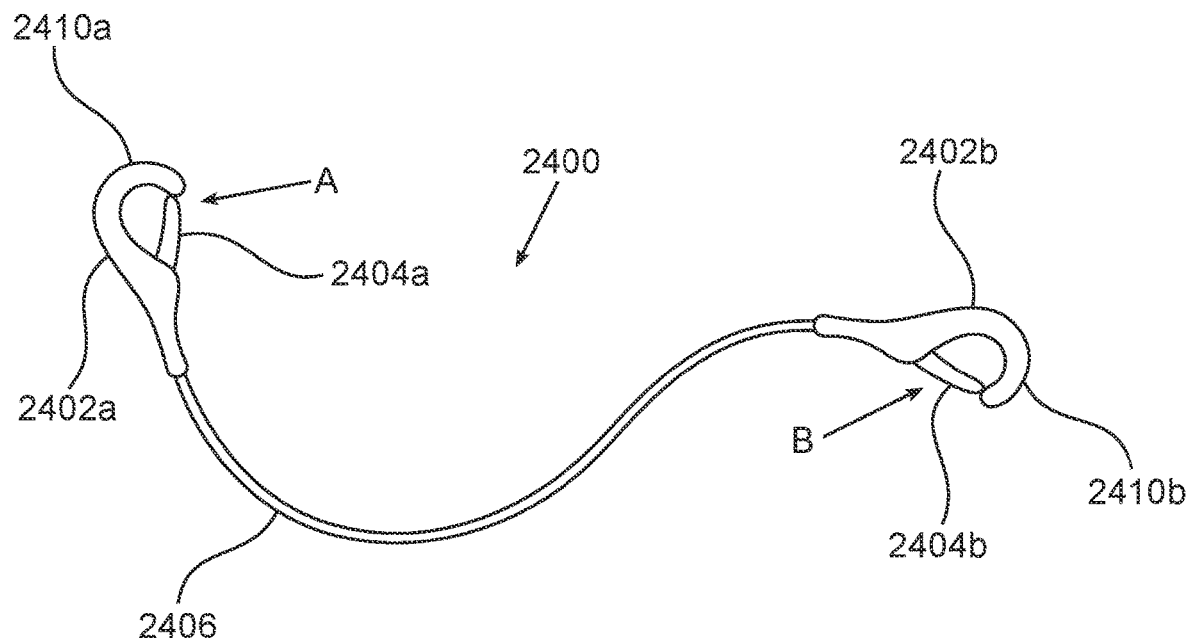
Figure 27:
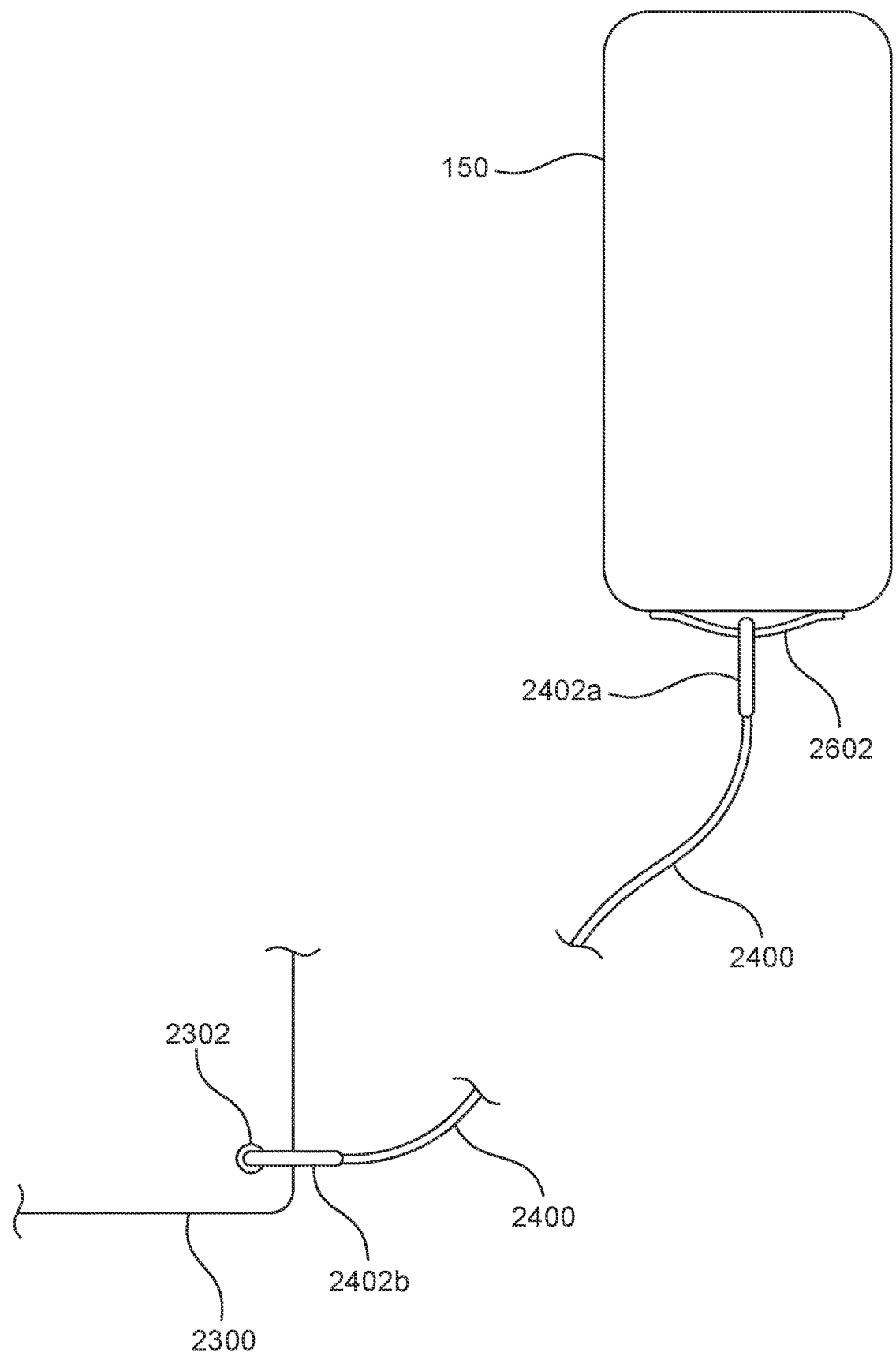

The hole 2302 in the keeper plate 2300 is provided for reception of a safety clip assembly 2400, which is shown in FIG. 24, which may be attached to the keeper plate 2300 and a tape measure 150 as shown and described in regard to FIG. 27.

The keeper plate 2300 may be attached to a user's belt or pants via clip 110 (shown in FIG. 25), in a manner as described above. Ridge 2306 maintains a lower part of keeper plate 2300 away from a tape measure 150 when attached thereto (via the permanent magnet 130 that is attached to tape measure 150, as in the embodiments of FIGS. 10-13), so that the user may attach the safety clip assembly 2400 to the keeper plate 2300 at the hole 2302.

Referring now to FIG. 24, the present invention may include a safety clip assembly 2400 comprising a first and second clip assemblies 2410a and 2410b, each of which comprise a first and second hook 2402a and 2402b respectively, and a safety clip assembly 2404a and 2404b and further comprises a cable 2406, which can be made of any length to accommodate normal actions of users.

Figure 25F:
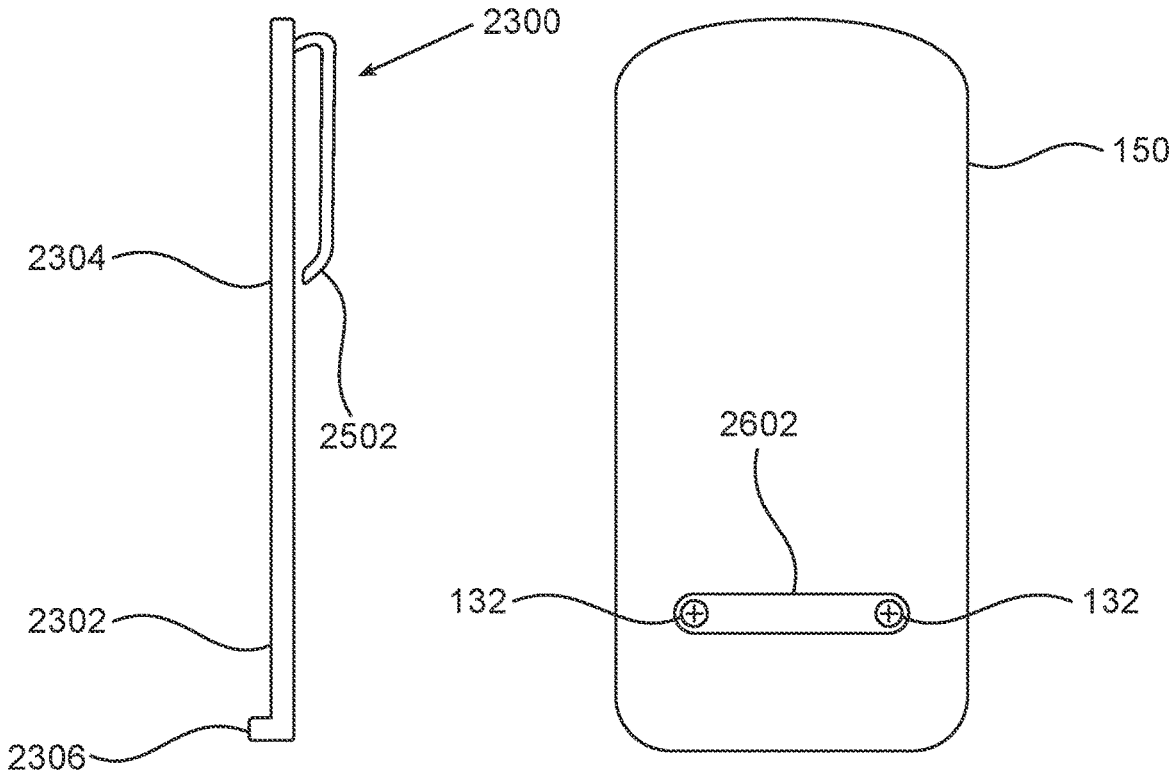

FIG. 25 illustrates a side view of a keeper plate 2300, showing a clip 2502, which "keeps" the keeper plate 2300 affixed to the pants or belt of a user. The keeper plate 2300 may comprise a hole 2302, a planar portion 2304, and a ridge 2306 located at a bottom-most part of the planar portion 2304. The keeper plate 2300 is similar in structure and function as magnetically cohesive mounting clip plate 1000 as shown in FIGS. 10-13.

FIGS. 26 and 27 illustrates a rear and top view of a tape measure 150 with a clasp 2602 according to aspects of the embodiments. The clasp 2602 is provided and affixed to a tape measure 150 to facilitate a user in securing a tape measure 150 to the keeper plate 2300 through the use of the safety clip assembly 2400 according to aspects of the embodiments.

As shown in FIG. 27, a tape measure 150 may be removably but securely attached to the keeper plate 2300 through use of the safety clip assembly 2400; that is, a first hook 2402a and corresponding hook arm 2404a are manipulated in a known common manner to attach a first end of the safety clip assembly 2400 to a tape measure 150 at clasp 2602, and a second end of the safety clip assembly 2400 attached to the keeper plate 2300 at the hole 2302 using second hook 2402b and corresponding hook arm 2404b.

As those of skill in the art can appreciate, hook arms 2404a and 2404b may be spring loaded and rotational in configuration such that they rotate in the direction of Arrows A and B as shown in FIG. 24, and when released return to the retaining or closed state (which is as shown in FIG. 24).

Figure 28A:
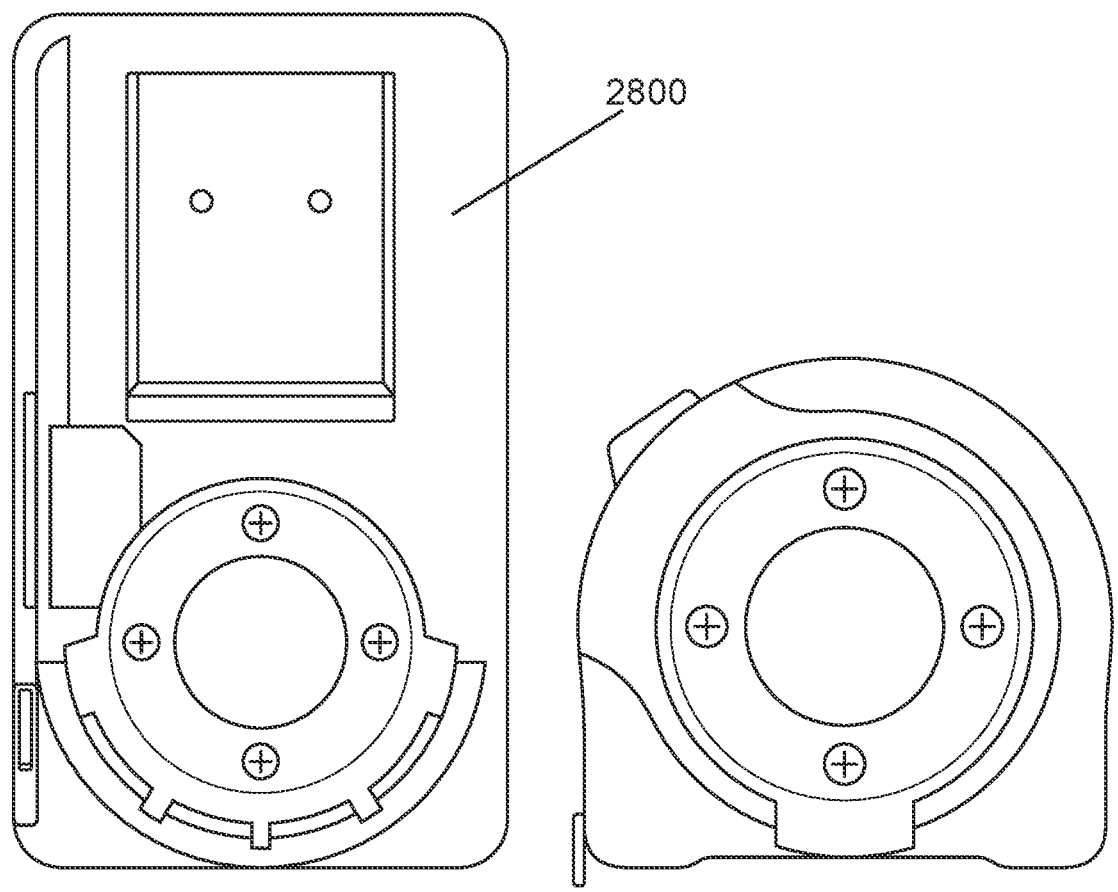
FIGS. 28A-28B illustrate a further embodiment of the invention.
Figure 28B:
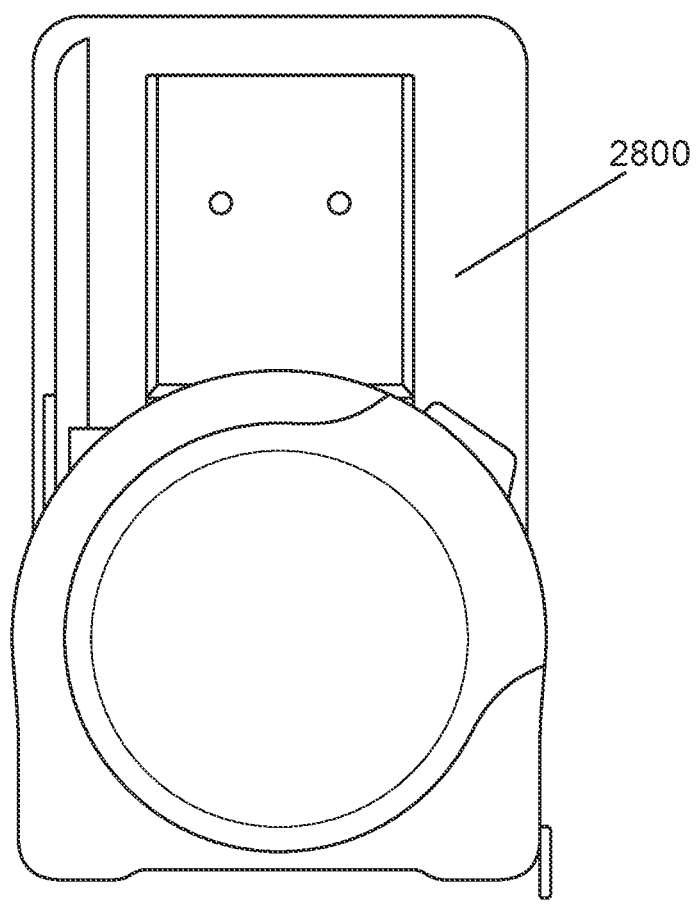

FIG. 28A depicts an embodiment of the present invention showing a tape measure and inventive magnetic tape measure housing apart from a corresponding keeper plate; with FIG. 28B depicting a tape measure and inventive magnetic tape measure housing cohered to a corresponding keeper plate.

FIG. 28A and FIG. 28B illustrate a further embodiment of the invention. showing a tape measure and inventive magnetic tape measure housing apart from a corresponding keeper plate. In FIG. 28A, a side view of the keeper plate (2800) is shown. The keeper plate (2800) may include a lobster clasp on a slightly stretchable thin rope cord. The keeper plate may include nubs (square, circular or other shapes) on the other side for a shirt tuck in option. The plate may include a retractable cable with lobster clasps. The plate may include an eye screw for a lobster clasp. Additional embodiments are included in the appendices, the contents which are incorporated by reference into this application.

Moreover, FIGS. 28A and FIG. 28B are illustrative of a side view of a first assembly magnet-to-magnet tape measure retention means for magnetically and removably retaining a tape measure to a user via a belt clip assembly. A first assembly may comprise plastic shroud magnetic housing, and non-magnetic magnet retainer.

In operation, the magnet-to-magnet tape measure retention means provides a first permanent magnet disposed in or on a tape measure via a housing and retainer.

A permanent magnet may fit within a retainer. The retainer may be substantially cylindrical in shape and sized to accept in a snug fit of a first permanent magnet; the retainer may be comprised of a non-magnetic material such as aluminum (among many other non-magnetic metals that can be used). A screws or other retention means may be used to secure the entire assembly to a tape measure.

In certain embodiments, the device has a dual magnetic attract system. As you put the tape measure anywhere near the retriever, The magnets on each component attract and attach. If you happen to be climbing a ladder and need a safety mechanism so the tape measure does not fall down below, there is an elastic tether that is clipped to the keeper plate that can be unclipped and clipped (lobster style clip or something like that) onto the tape measure. That way, if you bump against something on the way up the ladder, or if you are up on the roof, your tape measure will not fall below and possibly injure someone.

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

The invention claimed is:

1. A magnetic tape measure mount, comprising:
   a housing having a permanent magnet encompassed within the housing, the housing having a flange connection extending away from the housing;
   a fastening device configured to affix the housing to the tape measure; and
   a magnetically coherent mounting plate, the permanent magnet configured to be magnetically cohesive with the magnetically coherent mounting plate to releasably secure the housing and tape measure to the magnetic coherent mounting plate,
   wherein the magnetically coherent mounting plate comprises a non-magnetic magnet retainer, the non-magnetic magnet retainer retains the flange connection of the housing when the housing is secured to the magnetically coherent mounting plate.

2. The magnetic tape measure mount of claim 1, wherein the magnetically coherent mounting plate includes a clip configured to attach the magnetically coherent mounting plate to a user's waistline/belt line, or work belt.

3. The magnetic tape measure mount of claim 2, wherein the clip is welded or riveted to the magnetically coherent mounting plate.

4. The magnetic tape measure mount of claim 1, wherein the permanent magnet has a doughnut shape.

5. The magnetic tape measure mount of claim 1, wherein the permanent magnet has a disc shape.

6. The magnetic tape measure mount of claim 1, wherein the proximal side of the housing abuts the tape measure, and the distal side of the housing faces the magnetically coherent mounting plate.

7. The magnetic tape measure mount of claim 1, wherein the magnetically coherent mounting plate has a surface area larger than the permanent magnet.

8. The magnetic tape measure mount of claim 1, wherein the fastening device is a screw.

9. The magnetic tape measure mount of claim 1, wherein the magnetically coherent mounting plate is round with a flat bottom edge.

10. The magnetic tape measure mount of claim 1, wherein the housing includes a washer-type or disc shape.

11. The magnetic tape measure of claim 1, wherein the permanent magnet provides sufficient magnetic flux density to releasably secure the tape measure and housing to the magnetically coherent mounting plate during use and wear of the tape measure by the user.

12. The magnetic tape measure of claim 1, wherein the permanent magnet is from the group consisting of rare earth elements, neodymium, ceramics, and combinations thereof.

13. The magnetic tape measure of claim 1, wherein the housing comprises a plastic, a silicone rubber, or a metal and is resistant and/or impervious to air and water intrusion.

14. The magnetic tape measure of claim 1, wherein a housing is removable from the tape measure and replaceable with a housing containing a permanent magnet of a differing magnetic flux density.

15. The magnetic tape measure of claim 1, wherein the non-magnetic magnet retainer is semi-circular in shape.

16. The magnetic tape measure mount of claim 1, further comprising a safety clasp connected on one end to the magnetically coherent mounting plate and on the other end to the housing.

17. The magnetic tape measure mount of claim 16, wherein the safety clasp includes a retractable cable.

18. The magnetic tape measure mount of claim 1, wherein the magnetically coherent mounting plate includes a bore for the safety clasp.

19. The magnetic tape measure mount of claim 1, wherein the non-magnetic magnet retainer includes a bore that is configured to receive the flange member of the housing.

20. A kit to retrofit an existing tape measure, the kit comprising:
   a housing having a permanent magnet encompassed within the housing, the housing having a flange connection extending away from the housing;
   a fastening device configured to fasten the housing to the existing tape measure; and
   a magnetically coherent mounting plate,
   wherein the magnetically coherent mounting plate comprises a non-magnetic magnet retainer, the non-magnetic magnet retainer retains the flange connection of the housing when the housing is secured to the magnetically coherent mounting plate.

* * * * *